United States Patent
Kotani

(10) Patent No.: US 7,548,247 B2
(45) Date of Patent: Jun. 16, 2009

(54) IMAGE EDITING APPARATUS AND CONTROL METHOD FOR THE SAME, COMPUTER PROGRAM, STORAGE MEDIA

(75) Inventor: Takuya Kotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 378 days.

(21) Appl. No.: 11/462,518

(22) Filed: Aug. 4, 2006

(65) Prior Publication Data
US 2007/0035790 A1 Feb. 15, 2007

(30) Foreign Application Priority Data

Aug. 12, 2005 (JP) .............................. 2005-234701
Jan. 5, 2006 (JP) .............................. 2006-000790

(51) Int. Cl.
G09G 5/02 (2006.01)
G06K 9/64 (2006.01)
G06K 9/00 (2006.01)
H04N 1/46 (2006.01)
H04N 1/40 (2006.01)
G06F 17/30 (2006.01)
H04N 5/228 (2006.01)

(52) U.S. Cl. .................... 345/619; 345/581; 345/520; 358/448; 358/452; 358/453; 358/537; 382/282; 382/295; 382/305; 715/700

(58) Field of Classification Search ................ 345/581, 345/606, 619, 629–630, 649–650, 520, 536, 345/530–531; 358/525, 448, 537–538, 452–453; 382/276, 282, 284, 300, 295, 305; 715/255, 715/700

See application file for complete search history.

(56) References Cited

U.S. PATENT DOCUMENTS

| 6,583,823 | B1 | 6/2003 | Shimada et al. ............. 348/616 |
| 2004/0263887 | A1 | 12/2004 | Kotani | |
| 2006/0007244 | A1* | 1/2006 | Matsumoto .................. 345/619 |
| 2006/0155612 | A1* | 7/2006 | Haeberli ...................... 705/26 |
| 2008/0107330 | A1* | 5/2008 | Cotman et al. .............. 382/156 |

FOREIGN PATENT DOCUMENTS

| JP | 06-195172 | 7/1994 |
| JP | 11-103447 | 4/1999 |
| JP | 2001-223894 | 8/2001 |

* cited by examiner

*Primary Examiner*—Wesner Sajous
(74) *Attorney, Agent, or Firm*—Fitzpatrick, Cella, Harper & Scinto

(57) ABSTRACT

The present invention enables dust removal to be effectively performed even when using the operation history on images containing different pictures. An image editing apparatus includes a storage unit for storing a plurality of image data to be edited and a display unit for displaying the image data to be edited, an image processing unit adapted to perform image processing on the image data to be edited, a history storage unit adapted to store information regarding the processing history of image data to be edited which have previously undergone image processing, a position obtaining unit adapted to obtain position information regarding a position at which the image processing had been applied from the processing history information, and a display controller adapted to cause a portion, to which the image processing would be applied among the images to be edited, to be displayed on a display area for images to be edited on the display unit, based on the position information.

10 Claims, 25 Drawing Sheets

F I G. 1
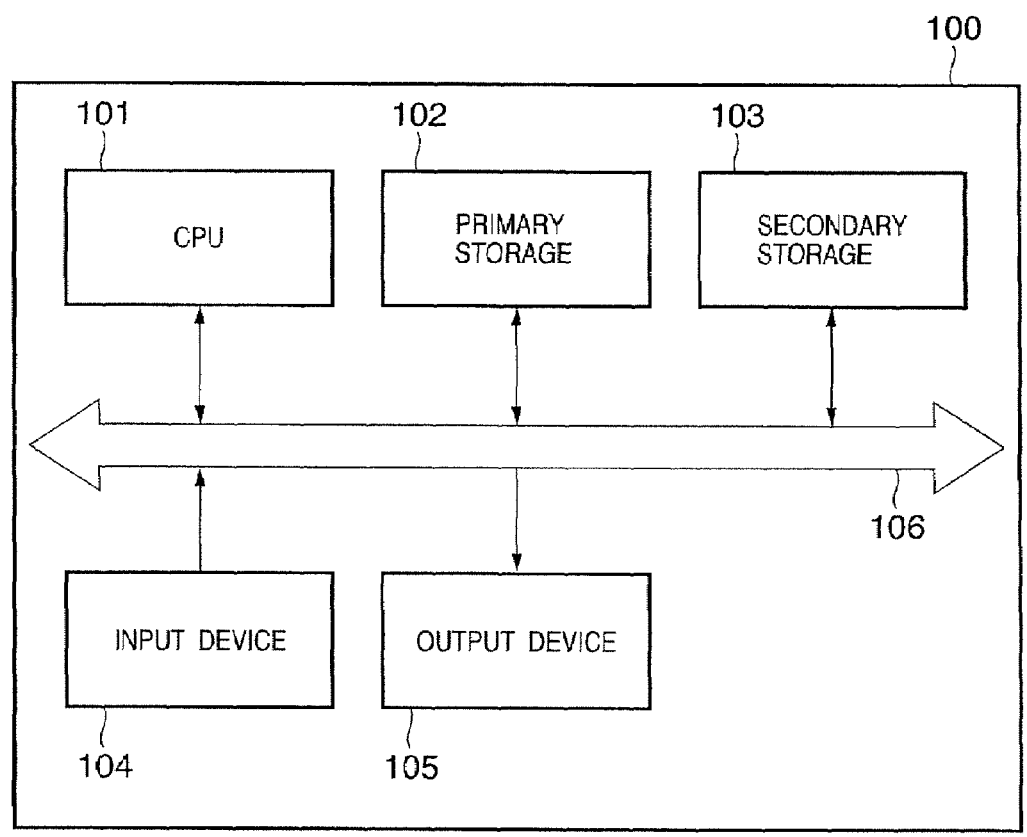

F I G. 20
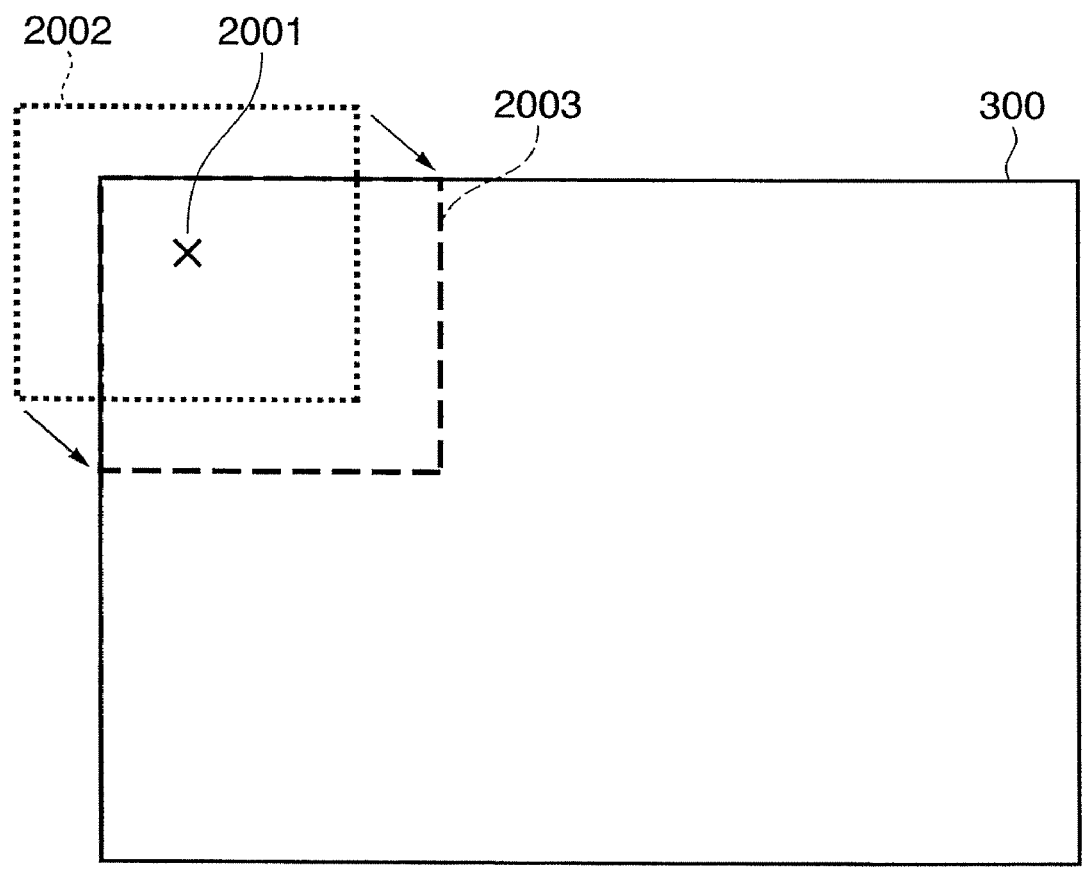
IMAGE TO BE EDITED

IMAGE EDITING APPARATUS AND CONTROL METHOD FOR THE SAME, COMPUTER PROGRAM, STORAGE MEDIA

BACKGROUND OF THE INVENTION

1. Field of the Invention

The present invention relates to an image editing apparatus and control method for the same, a computer program, and storage media.

2. Description of the Related Art

One structural problem of digital single-lens reflex cameras is that their image capturing sections, which are composed of image capturing sensors and the like, are exposed to the outside atmosphere when changing lenses, unlike cameras of the noninterchangeable lens type (integrated type). Therefore, dust sticks to lowpass filters and the like on the image sensors, and is eventually incorporated into image data. While hardware support is essential in solving such dust problems, in order to rescue image data shot by cameras without such countermeasures in place, support by PC software (PC applications) is effective at the present moment.

Possible methods for solving the dust problem using PC applications include:

(1) Automatic dust reduction processing using image analysis; and (2) Area copying processing.

(1) is a method involving determining the position of dust in an image, and removing the dust by estimating a pixel value which composes that area. (2) is a method in which dust is removed by combining pixel values of another area over the dust area, and allows an application user to manually remove the dust area by designating both the copy source area and the copy destination area.

In addition, while (1) is automatically processed in its entirety and therefore enables operation costs to be minimized, analysis processing such as preparing an image for dust area identification becomes an issue, and risks such as image quality deterioration due to erroneous decisions exist. On the other hand, although (2) requires high operation costs since area designation is performed entirely by hand, output results may be reliably matched with the application user's intentions.

Area copying processing is a function generally included in image processing applications as typified by PhotoShop by Adobe Systems Incorporated, and is a retouch method for hiding dust using similar, surrounding images.

However, even when processing a plurality of images, general image processing applications require processing from scratch for every image, and are therefore bothersome. In this light, since the positions of dust in digital single-lens reflex cameras are generally the same in image data obtained by the same body around the same time, a method may be contemplated involving storing the operation history in a memory, and using the exact same processing as in the operation history on other images. Image processing applications equipped with such functions include those which store the operation history in a copy buffer and use the exact same processing as in the copy buffer while also giving consideration to the rotation direction of an image.

In addition, a method has also been proposed in which compensation processing targeting moving image data is performed on a first frame of consecutive frames, and automatically applying the same processing on subsequent frames (see Japanese Patent Laid-Open No. 11-103447). Meanwhile, another method has also been proposed for an image input apparatus using a mouse, wherein an instruction for previously designated coordinates is instantaneously realized on a screen through a separate button operation (see Japanese Patent Laid-Open No. 06-195172).

However, while methods using the operation history as-is may be effective on images which contain identical pictures, it is highly likely that the use of such methods on images which contain different pictures will result in inappropriate processing. This is an issue which will not be solved even if the rotation directions of images are brought into consideration.

SUMMARY OF THE INVENTION

In consideration of the above, the present invention enables dust removal to be effectively performed even when using the operation history on images containing different pictures.

In order to solve the above problems, the present invention, according to one aspect of one of the preferred embodiments, relates to an image editing apparatus including a storage unit for storing a plurality of image data to be edited and a display unit for displaying the image data to be edited, the image editing apparatus comprising, an image processing unit adapted to perform image processing on the image data to be edited, a history storage unit adapted to store processing history information of image data to be edited which have previously undergone image processing, a position obtaining unit adapted to obtain position information regarding a position to where the image processing had been applied from the processing history information, and a display controller adapted to cause a portion, to which the image processing would be applied among the images to be edited, to be displayed on a display area of images to be edited on the display unit, based on the position information.

Further features of the present invention will become apparent from the following description of exemplary embodiments (with reference to the attached drawings).

BRIEF DESCRIPTION OF THE DRAWINGS

FIG. 1 is a diagram showing an example of a configuration of an image editing apparatus corresponding to an embodiment of the present invention;

FIG. 20 is a diagram showing an outline of compensation processing of a display position;

DESCRIPTION OF THE EMBODIMENTS

Figure 2:
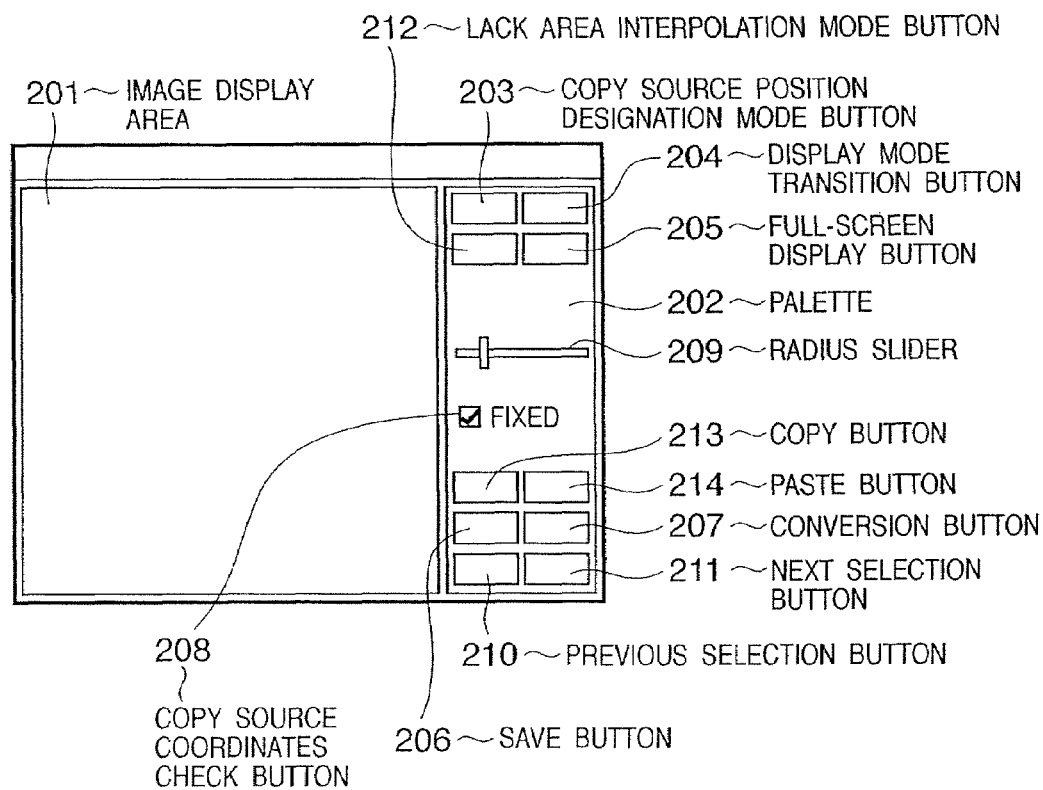
FIG. 2 is a diagram showing an example of a GUI corresponding to an embodiment of the present invention.

Preferred embodiments of the present invention will now be described with reference to the drawings attached hereto.

FIG. 1 is a diagram showing a summarized configuration of an image editing apparatus 100 corresponding to an embodiment of the present invention. A CPU 101 controls operations of the entire system, and executes programs stored in a primary storage 102 and the like. The primary storage 102 is principally a memory, and reads and stores programs and the like stored in a secondary storage 103. The secondary storage 103 is composed of, for instance, a hard disk. In general, the capacity of the primary storage 102 is smaller than that of the secondary storage 103. Thus, programs and data or the like which cannot be stored in the primary storage 102 will be stored in the secondary storage 103. In addition, data and the like which require to be stored over an extended period of time are also stored in the secondary storage. In the present embodiment, programs are stored in the secondary storage 103 and are read into the primary storage 102 by the CPU 101 upon program execution.

An input device 104 is composed of, for instance, a mouse or keyboard to be used for system control, as well as a card reader, scanner, film scanner or the like necessary for inputting image data. An output device 105 is composed of, for instance, a monitor and a printer. A bus 106 mutually connects the CPU 101, the primary storage 102, the secondary storage 103, the input device 104, and the output device 105.

Although other various forms may be contemplated for the configuration of the image editing apparatus 100, since the differences among such forms of configuration are not the aim of the present invention, descriptions thereof will be omitted.

The image editing apparatus 100 corresponding to the present embodiment is equipped with an operation system capable of parallel execution of a plurality of programs, and an operator may operate programs running on the image editing apparatus 100 using a GUI. In the present embodiment, the operation system is assumed to be, for instance, Windows (registered trademark) by Microsoft Corporation. Therefore, while the description of the present embodiment is dependent on the specifications of Windows (registered trademark), it is needless to say that the present invention may be realized in other environments.

Next, a GUI (graphical user interface) which performs area copying processing will be described as an example of a processing information stack. FIG. 2 is a diagram showing a GUI of an image editing program according to the present embodiment. The GUI is displayed on a monitor as an output device 105.

An image to be processed is displayed in an image display area 201. A palette 202 comprises buttons and the like for changing display settings or processing parameters. The buttons include: a copy source position designation mode button 203, a lack area interpolation mode button 212, a display mode transition button 204, and a full-screen display button 205. Also included is a copy source coordinates check button 208 which enables selection of either a fixed mode in which copy source coordinates are fixed regardless of changes in copy destination coordinates, and a variable mode in which copy source coordinates change according to changes in copy destination coordinates while maintaining relative coordinates to the copy destination coordinates. The palette 202 also includes a radius slider 209 which designates a radius of a blend area, and a previous selection button 210 and a next selection button 211 for selecting a "next image" or "previous image" when a plurality of images are to be processed. The palette 202 further includes a save button 206 for attaching a processing information stack to an image, and a conversion button 207 for outputting image after application of the processing information stack. The palette 202 further includes a copy button 213 for copying the processing information stack of an image being edited onto the memory, and a paste button 214 for applying a processing information stack existing on the memory to an image being edited.

Figure 3A:
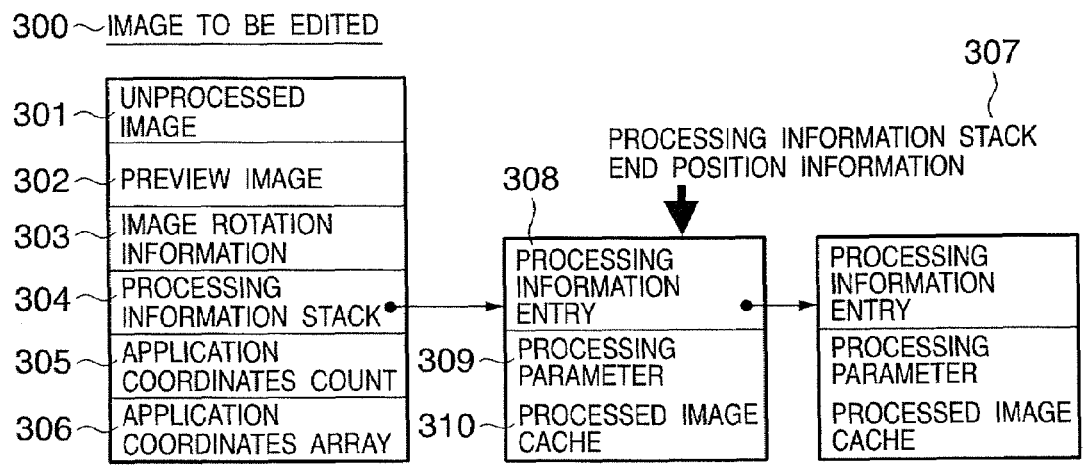
FIGS. 3A and 3B are diagrams showing examples of data retained in response to GUI input corresponding to an embodiment of the present invention.
Figure 3B:
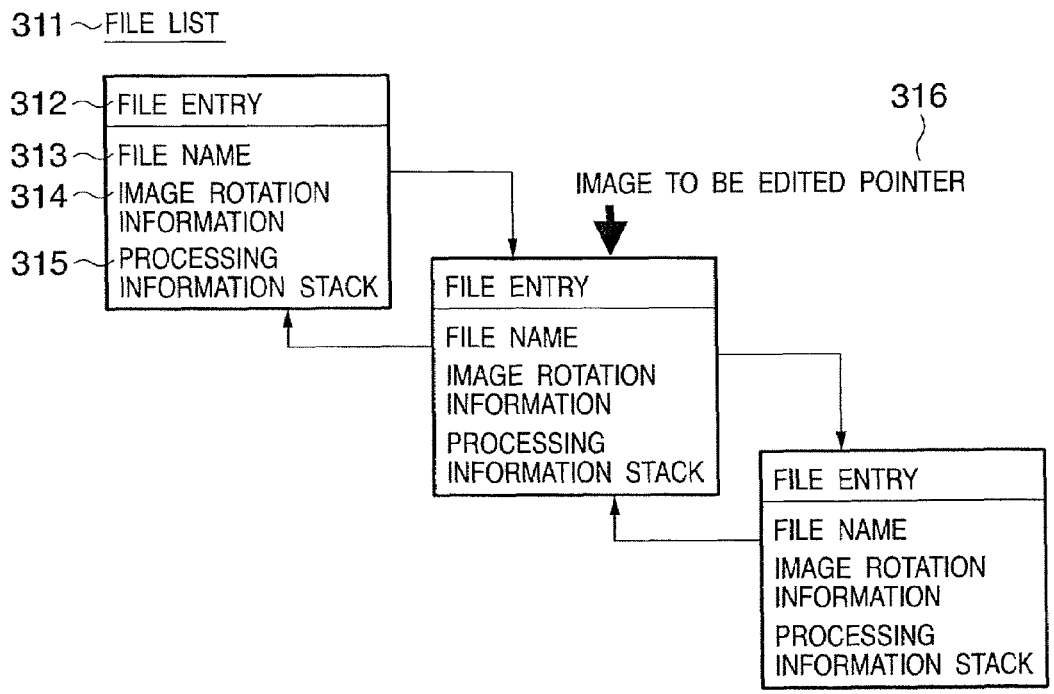

FIGS. 3A and 3B are diagrams showing examples of data retained in response to GUI input corresponding to FIG. 2. FIG. 3A shows a data structure of the image to be edited 300, while FIG. 3B shows a data structure of a file list 311 to which the image to be edited 300 will be registered. These data will be retained in the secondary storage 103.

In the present embodiment, all the images to be edited 300 that are to be processed are registered in the file list 311. File entries 312 composing the file list 311 include file names 313 of each image, image rotation information 314 and processing information stacks 315. In addition, an image to be edited pointer 316 which indicates a file entry 312 is provided. A file corresponding to the file entry 312 referenced by the pointer 316 will become the image to be edited 300.

The image to be edited 300 includes an unprocessed image 301 which is an image in an unprocessed state, and a preview image 302 to which a processing information stack 304 has been already applied. The unprocessed image 301 is included for undo/redo processing which will be described later.

While the processing information stack 304 of the image to be edited 300 and the processing information stack 315 of the file entry 312 are depicted as separate data in FIG. 3B, the processing information stack 315 of the file entry 312 may be directly referenced. In the present embodiment, it is assumed that the processing information stack 304 directly references the processing information stack 315 of the file entry 312.

In addition, in order to record a plurality of area copying processing into a single processing information entry 308 by a single drag operation, coordinates notified by the OS in accordance with drag operations are stored in an array referred to as an application coordinates array 306. The number of coordinates stored is retained in an application coordinates count 305. Therefore, it is necessary to initialize the application coordinates count 305 to 0 upon commencement of area copying processing.

The processing information entry 308 includes processing parameters 309 and a processed image cache 310. The processing parameters 309 are information indicating what image processing has been applied to what coordinates. Image processing according to the present embodiment includes area copying processing which has an image processing ID of "0x0000", and lack area interpolation processing which has an image processing ID of "0x0001". The processing parameters 309 according to the present embodiment include an image processing ID, a radius r which indicates an application range of the image processing corresponding to the image processing ID, an application coordinates array 306, and an application coordinates count 305.

A difference of an image between before and after application of image processing recorded in the processing information entry 308 is retained in the processed image cache 310. By retaining such cache, image processing may be executed at a higher speed than actually executing image processing. The cache is mainly used in undo/redo processing.

An image editing program corresponding to the present embodiment possesses image rotation information 303 as image processing information other than the processing information stack 304. As for image rotation, the image data itself may be rotated. On the other hand, an appropriate rotation direction of an image may be stored by assigning information indicating a rotation direction of an image instead of processing the image itself. For the rotation information, for instance, an EXIF (Exchangeable Image File Format for Digital Still Cameras) Orientation tag may be used. In this case, since no changes are made to the image data itself, there are no image quality deterioration due to decode processing for rotation processing, and may also be applied to special image data formats as typified by RAW data.

In this light, for the present embodiment, it is assumed that an image rotation result is retained by assigning image rotation information 303, which indicates a rotation direction of an image, to the image along with a processing information stack 304. As for designating a rotation of an image according to the present embodiment, a 90 degrees counter-clockwise rotation may be designated by, for instance, simultaneously pressing down on a Ctrl key and an L key of a keyboard as an input device 104. In addition, a 90 degrees clockwise rotation may be designated by simultaneously pressing down on the Ctrl key and an R key. Storage methods or data formats for image rotation information 303 and processing information stack 304 will be described later.

Figure 4:
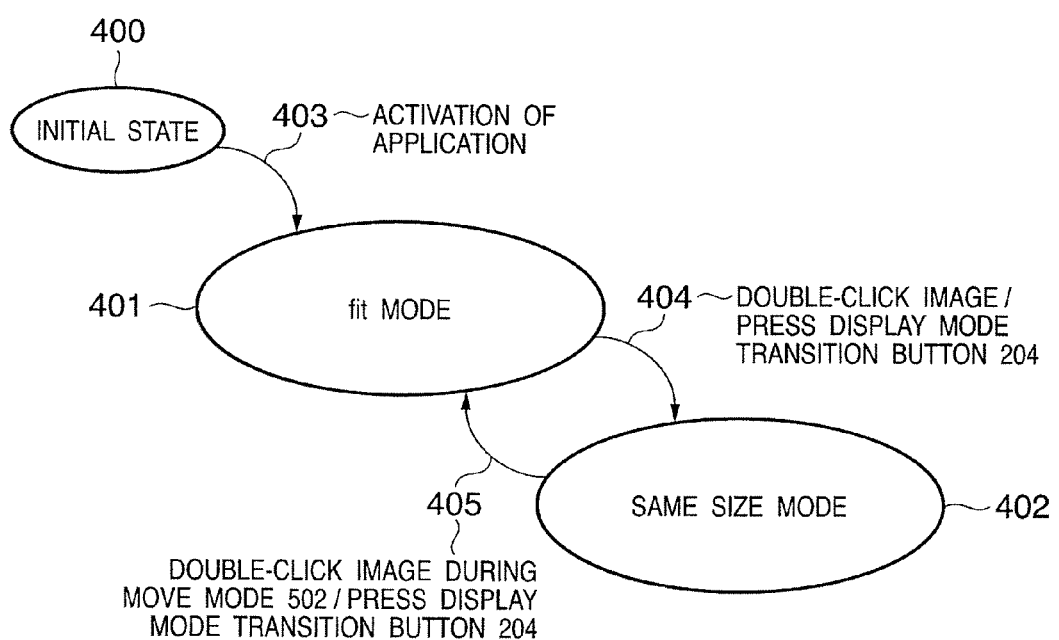
FIG. 4 is a diagram showing an example of a GUI state transition corresponding to an embodiment of the present invention.

Next, state transition of the GUI will be described with reference to FIG. 4. FIG. 4 is a diagram showing an example of a state transition of the GUI. The GUI is divided into two modes, namely: a fit mode 401 in which the image is fit-displayed, and a same size mode 402 in which the image is displayed at the same magnification. When an application is run from an initial state 400 (403), a mutual transition (404, 405) is made to a state corresponding to a transition command. In the embodiment, image processing is arranged to be prohibited during fit mode 401, and is only allowed during same size mode 402. This is due to the fact that difference data size in the processed image cache 310 becomes larger as the range on which image processing is to be executed becomes larger, and the memory area to be used by the application becomes significant. By restricting image processing operations to the same size mode 402, image processing range may be limited, thereby keeping increases in used memory size at a minimum.

During fit mode 401, only transition 404 to the same size mode 402 is executable. Transition 404 to the same size mode 402 may be performed either by pressing down on the display mode transition button 204, or by double-clicking on an image fit-displayed in the image display area 201. If the button 204 is pressed, a central portion of the image to be edited 300 is pixel-same size-displayed, and transition is made to the same size mode 402. Meanwhile, if the fit-displayed image has been double-clicked, the image is pixel-same size displayed so that the double-clicked image position is centered. During same size display, areas outside of the image are displayed as being blacked out.

Figure 5:
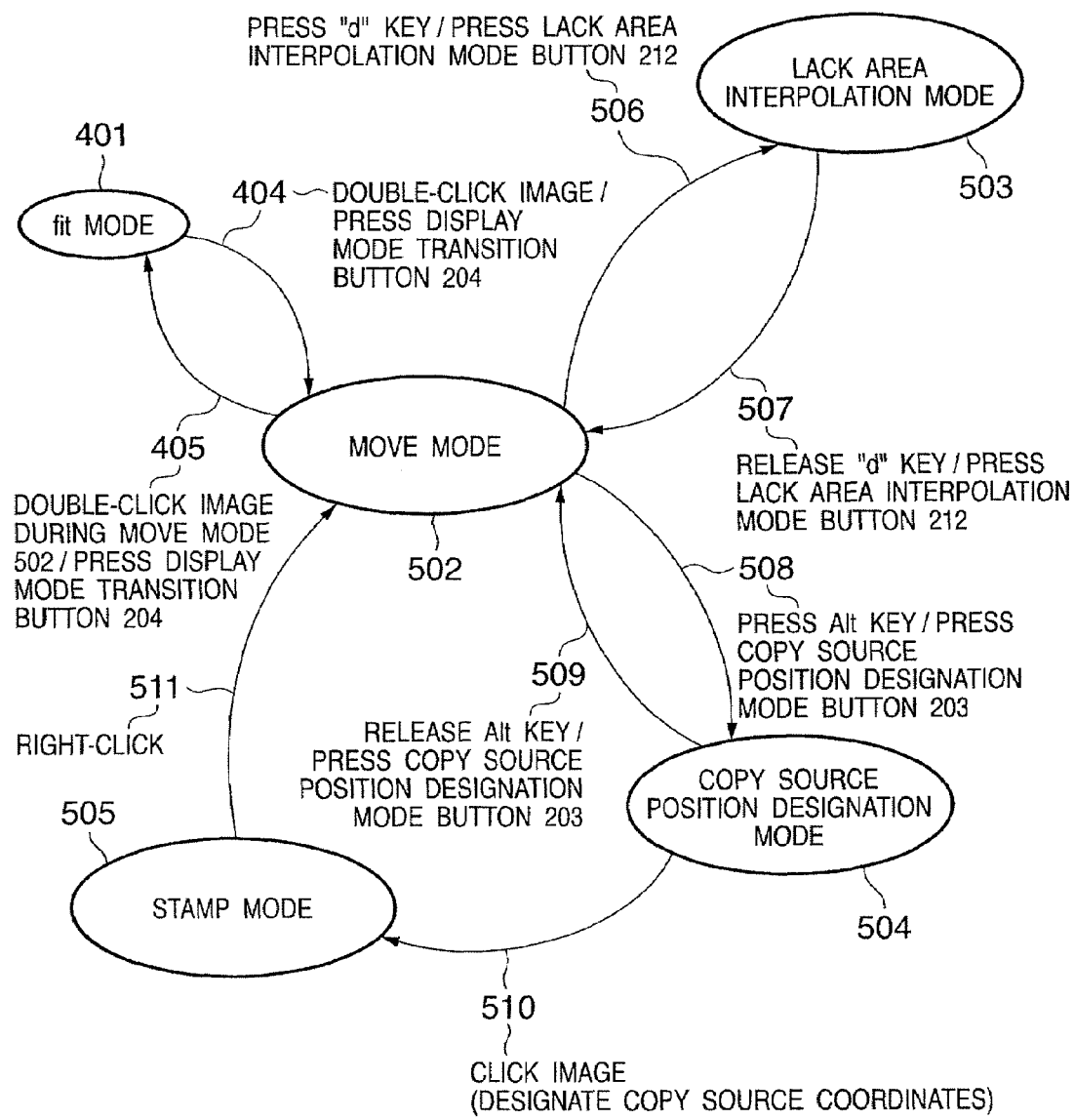
FIG. 5 is a diagram showing an example of a state transition during a same size mode 402 corresponding to an embodiment of the present invention.

Image processing is allowed during same size mode 402. State transition during same size mode will now be described with reference to FIG. 5. FIG. 5 is a diagram showing an example of state transition during same size mode 402.

A move mode 502 is assumed immediately following a transition (404) from the fit mode 401 to the same size mode 402. Transition (405) is made to the fit mode 401 from the move mode 502 by either double-clicking or by pressing the display mode transition button 204.

Display positions may be changed during move mode 502 using a scroll bar. The mode changes (506) to a lack area interpolation mode 503 during the move mode 502 as long as the "d" key of the keyboard is being pressed, or upon pressing of the lack area interpolation mode button 212. When the "d" key is released, or the lack area interpolation mode button 212 is pressed again, the mode returns (507) to the move mode 502. At this point, when the display mode transition button 204 is further pressed, the mode returns (405) to the fit mode 401. When an image is clicked during lack area interpolation mode 503, lack area compensation processing is executed on an area indicated by a circle with the clicked coordinates as its center and a radius designated by the radius slider 209. A detailed description on lack area compensation processing will be provided later with reference to FIG. 6.

The mode transits (508) to copy source position designation mode 504 during the move mode 502 as long as the Alt key is being pressed, or upon pressing of the copy source position designation mode button 203. When the Alt key is released, or the copy source position designation mode button 203 is pressed again, the mode returns (509) to the move mode 502. At this point, when the display mode transition button 204 is further pressed, the mode returns (405) to the fit mode 401. When an image is clicked during copy source position designation mode 504, a transition (510) is made to the stamp mode 505 while using the clicked position as copy source coordinates.

After the stamp mode 505 is assumed, area copying processing is performed on the first coordinates left-clicked as a copy destination. These coordinates are the first copy destination coordinates to be designated, and are particularly referred to as "reference coordinates" in the present embodiment. When the reference coordinates are updated, copy relative coordinates are set to an unconfigured state. In the embodiment "copy relative coordinates" represent relative coordinates from a copy destination area to a copy source area of the area copying processing.

A transition (511) to the move mode 502 is made when right-clicking during the stamp mode 505. At this point, when the display mode transition button 204 is further pressed, the mode returns (405) to the fit mode 401.

In the state transition diagram shown in FIG. 5, direct transition from the lack area interpolation mode 503 to the copy source position designation mode 504, and vice versa, is not allowed. Therefore, when the Alt key is pressed during the lack area interpolation mode 503, a transition may be made to the copy source position designation mode 504. In this case, when a copy source position is first designated and then the Alt key is released in this state, the mode transits to the stamp mode 505. Meanwhile, when the Alt key is released before the copy source position is designated, the mode may return to the lack area interpolation mode 503. Contrarily, when the "d" key is pressed during the copy source position designation mode 504 or the stamp mode 505, a transition may be made to the lack area interpolation mode 503. In this case, lack area interpolation processing is performed on the clicked coordinates as long as the "d" key remains pressed, and the mode may return to the original mode when the "d" key is released.

In addition, when the copy source position designation mode button 203 is pressed during the lack area interpolation mode 503, the lack area interpolation mode 503 may be exited and a transition may be made to the copy source position designation mode 504. Furthermore, when the lack area interpolation mode button 212 is pressed during the copy source position designation mode 504 or the stamp mode 505, these modes may be exited and a transition may be made to the lack area interpolation mode 503.

As seen, the usability of the GUI may be improved by enabling modes to be switched in a flexible manner.

Figure 6:
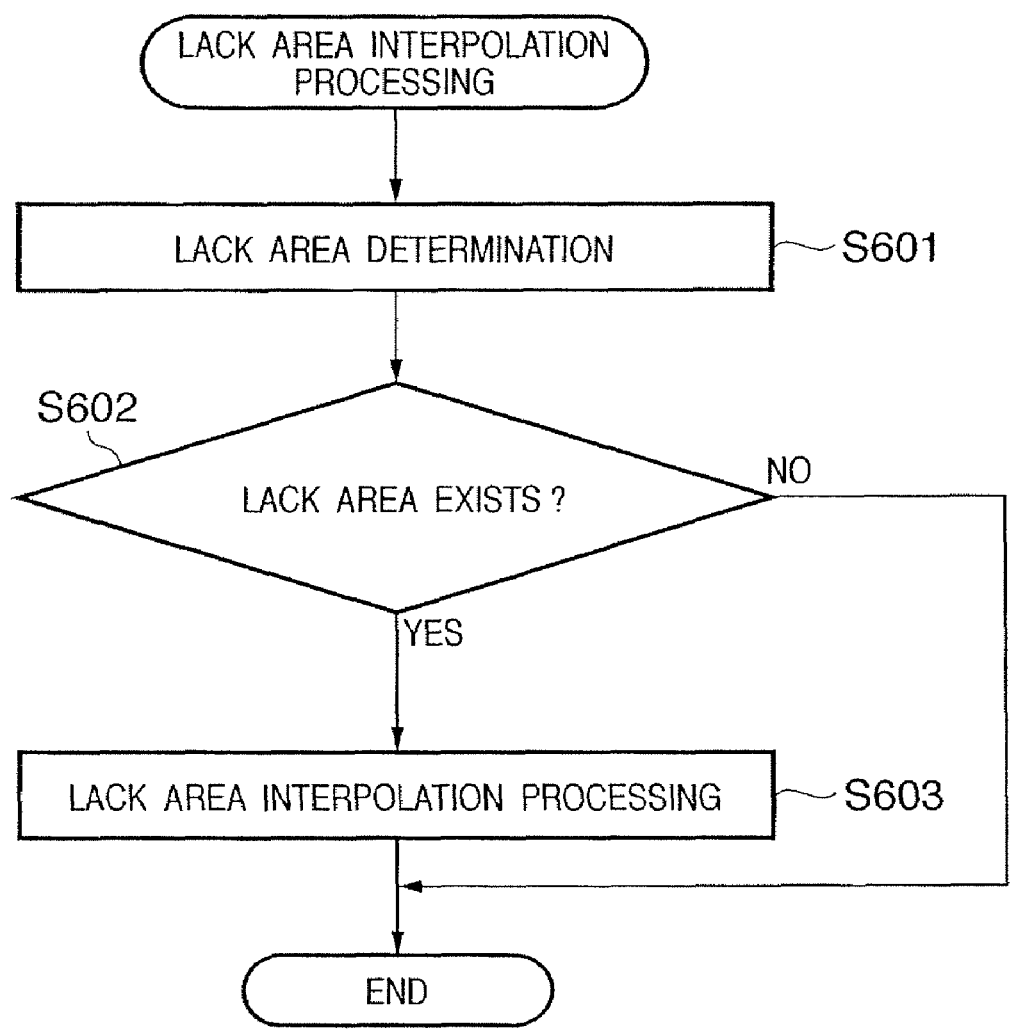
FIG. 6 is a flowchart showing an example of lack area interpolation processing corresponding to an embodiment of the present invention.

Next, a detailed description will be provided on lack area interpolation processing and area copying processing. First, a flowchart illustrating an example of lack area interpolation processing is shown in FIG. 6. In FIG. 6, lack area determination is first performed in step S601. A lack area (dust area) is defined herein as an area which fulfills all of the conditions listed below.

(1) An area which is darker than the average luminance within a designated area (2) An area which does not come into contact with a circle which indicates the designated area (3) An area in which the width and height of a rectangle which encloses the area is equal to or greater than 11 and less than 12.

In the above conditions, a designated area refers to an area enclosed in a circle where a center thereof is the coordinates left-clicked by the user and a radius thereof is a value designated by the radius slider 209, during the stamp mode or the lack area interpolation mode. In the present embodiment, 11 is assumed to be 5 (pixels), while 12 is assumed to be 50 pixels. By handling only areas of a certain size in this manner, it is possible to handle only isolated, small areas as lack areas. If such areas exist ("Yes" in step S602), the process proceeds to step S603 to perform lack area interpolation. On the other hand, if such areas do not exist ("No" in step S602), the present process is terminated.

The lack area interpolation processing executed in step S603 may be performed using well-known methods. In the present embodiment, lack area interpolation processing may be performed using, for instance, the method disclosed in Japanese Patent Laid-Open No. 2001-223894. More specifically, determination of whether an attention pixel is a normal pixel not included in the lack area is first performed, and when determined to be a normal pixel, determination is performed on whether the attention pixel has a color which is close to the pixels on both ends of the lack area. If the attention pixel is of close color, a determination is performed on whether the attention pixel is at the end of the image. When the attention pixel is not at the end of the image, the attention pixel is detected as a normal pixel pattern. A determination is performed on whether the lack area is larger than the detected normal pixel pattern. If the lack area is larger, the next pixel is used as the attention pixel, and the above-described processing is repeated until the normal pixel pattern becomes equal to or larger than the pixel-lack area.

While lack areas are identified using infrared light in Japanese Patent Laid-Open No. 2001-223894, since the present invention is targeted at images shot by a general digital camera, the area detected in step S601 will be handled as the lack area.

Figure 16:
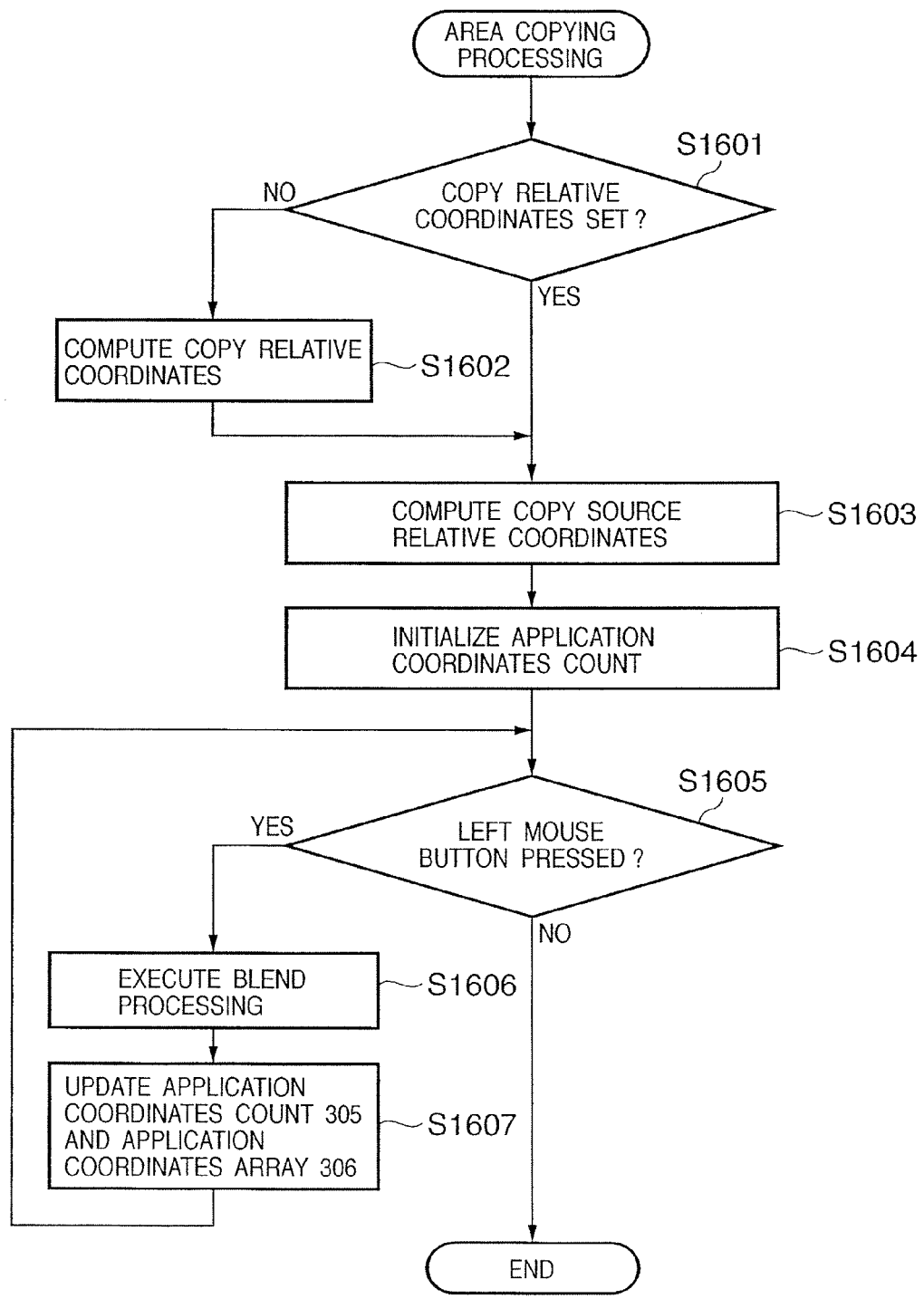
FIG. 16 is a flowchart showing an example of area copying processing corresponding to an embodiment of the present invention.

Next, a detailed description of area copying processing will be provided with reference to FIG. 16. FIG. 16 is a flowchart corresponding to an example of area copying processing.

First, in step S1601, a determination is performed on whether copy relative coordinates have been set. If it is determined that copy relative coordinates have been set ("Yes" in step S1601), the process proceeds to step S1603. On the other hand, if it is determined that copy relative coordinates have not been set ("No" in step S1601), the process proceeds to step S1602. In step S1602, relative coordinates from the reference coordinates to the copy source coordinates are obtained and will be deemed the copy relative coordinates.

In step S1603, the relative coordinates of the copy source position are computed. At this point, when the fixed mode is selected at the copy source coordinates check button 208 and the copy source position is fixed to be handled, relative coordinates of the copy source coordinates and the copy destination coordinates are used. On the other hand, when the variable mode is selected at the copy source coordinates check button 208 and the copy source position is relatively moved to be handled, copy relative coordinates are used. In step S1604, the application coordinates count is initialized to 0. Then, in step S1605, a determination is performed on whether the left button of the mouse is pressed. If the left button is pressed ("Yes" in step S1605), the process proceeds to step S1606. If not ("No" in step S1605), the process is terminated.

In step S1606, the coordinates indicated by the cursor of the mouse are deemed the copy destination coordinates, and blend processing from the copy relative coordinates is performed using a copy mask. Since copy masks are generated according to the state of the radius slider 209, copy masks are generated every time the state of the radius slider 209 changes. A description of the copy mask generation processing will be provided later. In addition, a detailed description of blend processing will also be provided later.

In step S1607, the application coordinates count 305 is incremented by one, and copy destination coordinates are added to the application coordinates array 306. The process then returns to step S1605.

Figure 17:
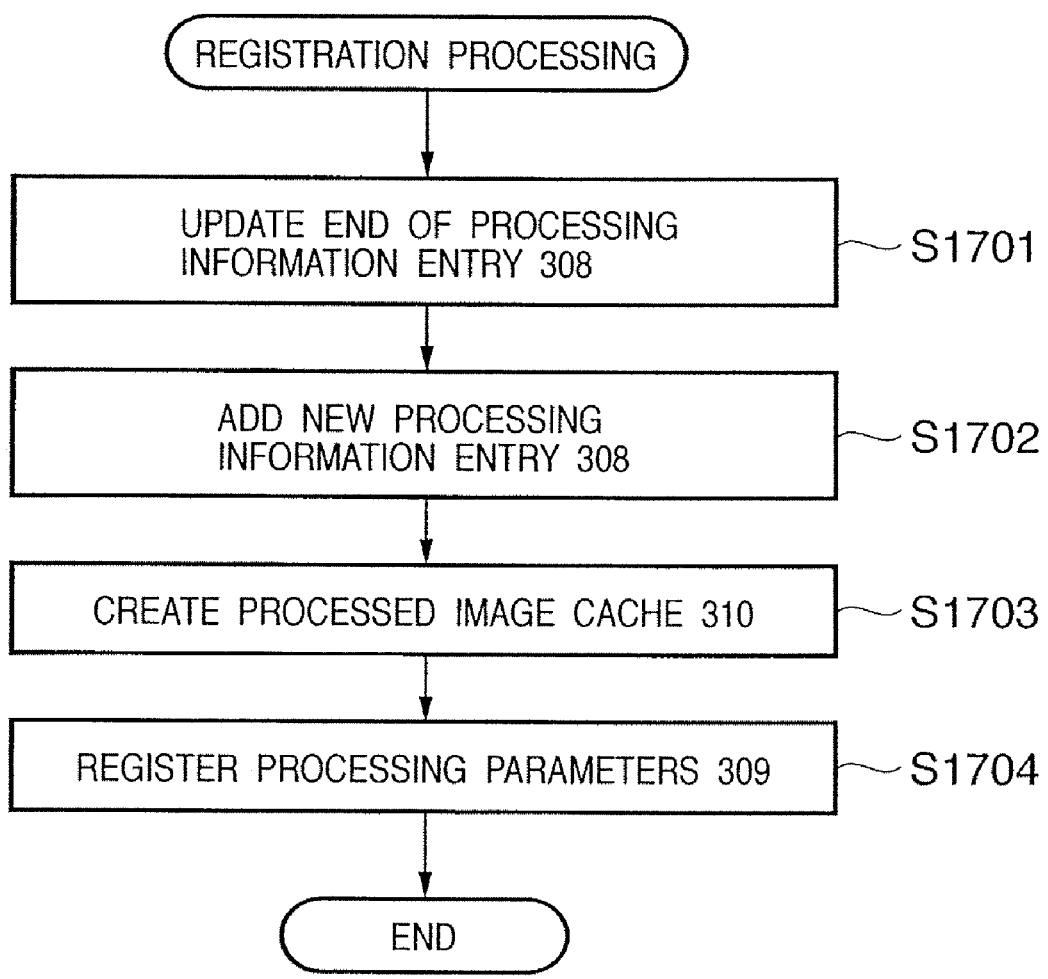
FIG. 17 is a flowchart showing an example of processing for registering results of lack area interpolation processing and area copying processing to the processing information stack 304 corresponding to an embodiment of the present invention.

Next, processing for registering the results of lack area interpolation processing shown in FIG. 6 and area copying processing shown in FIG. 16 to the processing information stack 304 will be described with reference to FIG. 17. FIG. 17 is a flowchart corresponding to an example of the registration processing.

As shown in FIG. 17, in step S1701, a processing information entry 308 which exists beyond processing information stack end position information 307 is discarded. In the subsequent step S1702, a new processing information entry 308 is created, and the processing information stack end position information 307 is updated so as to reference the newly created entry. Next, in step S1703, a partial image including the area changed by lack area interpolation processing or area copying processing is created, and is deemed a processed image cache 310.

In step S1704, an image processing ID, a radius r, copy relative coordinates, an application coordinates count and an application coordinates array are registered as processing parameters 309 of the processing information entry 308 created in step S1702, and the process is terminated. The values of the processing parameters 309 registered in step S1704 differs as follows according to contents of processing. In the case of lack area interpolation processing, the image processing ID is 0x0001, the radius r is the radius designated by the radius slider 209, the copy relative coordinates are 0 for both x and y directions, the application coordinates count is 1, and the application coordinates array is coordinates designated by the user.

On the other hand, in the case of area copying processing, the image processing ID is 0x0000, the radius is the radius designated by the radius slider 209, the copy relative coordinates are the relative coordinates computed in step S1603, and the application coordinates count and the application coordinates array are values updated in step S1607.

Image rotation information is used for both the copy relative coordinates and the application coordinates array, which are converted to coordinates prior to application of image rotation processing to be registered. Such processing enables image processing to be always applied to an appropriate position even when the rotation direction of an image is changed.

Next, a detailed description of the blend processing of step S1606 in FIG. 16 will be provided. In the present embodiment, blend processing refers to processing in which an area of a radius r with the copy source coordinates as its center is combined onto an area of a radius r with the copy destination coordinates as its center. The boundary between the area on which area copying processing is applied and the areas on which the processing is not applied becomes noticeable the further away from the copy destination coordinates unless the ratio of the copy source coordinates is reduced when performing combination processing. Therefore, the processing is performed so that the combination ratio is reduced more, the further away from the copy destination coordinates. In consideration of the above, combination processing is performed on a range with a radius of 2r. A map indicating the combination ratio is referred to as a copy mask.

Figure 7:
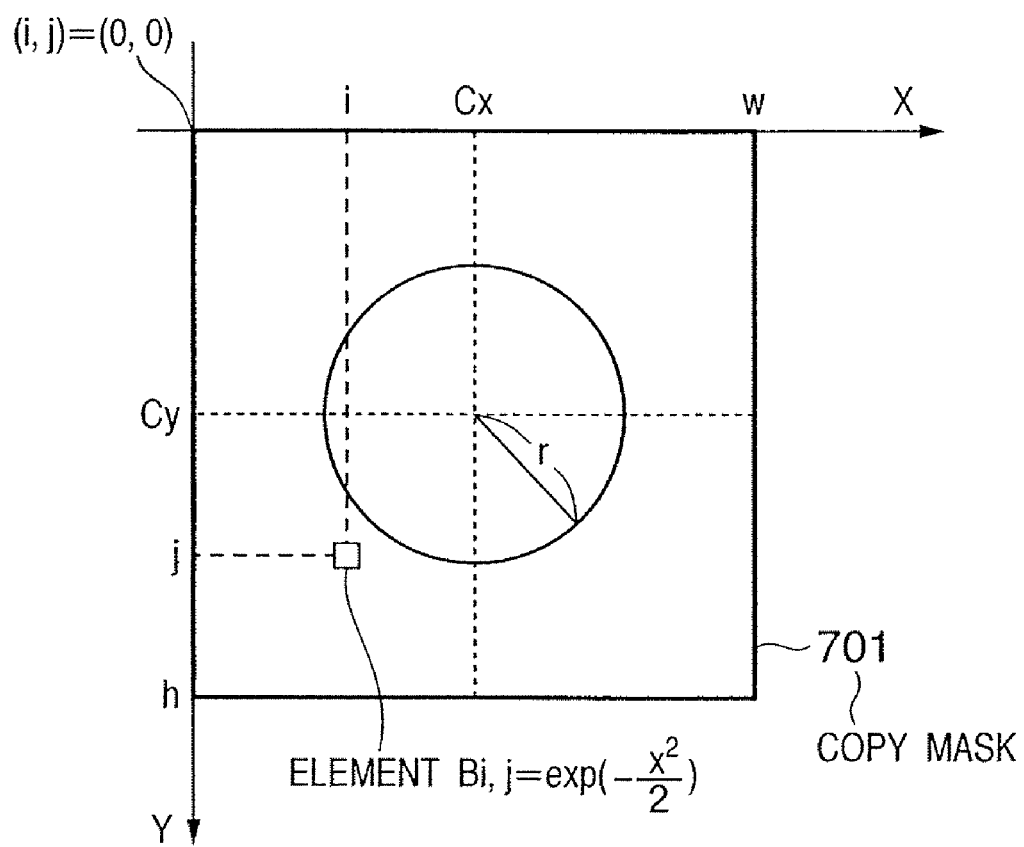
FIG. 7 is a diagram showing an example of a copy mask corresponding to an embodiment of the present invention.

An outline of a copy mask is as shown on FIG. 7. The ranges of each element of the copy mask 701 are [0.0, 1.0]. The larger the values, the pixel values of the copy source area are given higher priority. The elements of the copy mask are computed by values computed according to the distance from the center (Cx, Cy) of the copy mask. A description of the calculation method will be provided later. When copy source coordinates F and copy destination coordinates T are respectively coordinates in which −2*r is the x coordinate and −2*r is the y coordinate, and the origin is the top left corner of the copy mask, pixel values may be obtained by the following equation for blend processing of pixels at coordinates (i, j).

$$T'_{i,j}=B_{i,j}*F_{i,j}+(1.0-B_{i,j})*T_{i,j}$$

where F is the pixel at the copy source coordinates, T is the pixel of the copy destination area, B is a copy mask element, and T' is the pixel of the copy destination area after blend processing. In the present embodiment, pixel values after blending are computed by respectively combining RGB colors according to a blend ratio.

Processing performed on a trajectory of a mouse being dragged when the mouse is drag-operated in the processing indicated in FIG. 16 will now be described. With Windows (registered trademark), not all coordinates through which the mouse passes during the drag-operation are notified from the OS to an application. Rather, notification is performed at given intervals. The intervals, however, tend to be relatively long. In consideration of the above, when notification indicating a drag state is received, area copying processing is performed every given distance L on a line segment connecting the notified coordinates A (xa, ya) and the last notified coordinates B (xb, yb). By performing such processing, smooth area copying results may be obtained. The interval L on which area copying processing during dragging is applied is obtained by the following equation using the radius r designated by the radius slider 209.

$$L=\text{floor}(r/B+0.5)$$

where L=1 is used when L=0. In the above equation, floor (x) represents an integer value of a real number x, with its decimal places truncated. In addition, B is an empirically obtained value, and B=4. 7 is used for the present embodiment.

The calculation method for copy mask elements shown in FIG. 7 will now be described. A mask element $B_{i,j}$ may be obtained by the following equation.

$$B_{i,j}=\exp(-x^2/2)$$

where x is expressed by $$x=(4/r)*\{(Cx-i)^2+(Cy-j)^2\}^{1/2}$$

Cx, Cy are the center coordinates of the mask shown in FIG. 7, and in the present embodiment, it is assumed that (Cx, Cy)=(2*r, 2*r). Thus, the copy mask size is a width (4*r+1) element and a height (4*r+1) element. i, j are coordinate values where a top left corner is expressed as (i, j)=(0, 0), and the range of i, j is [0, 4*r]. In the above, r is a radius designated by the radius slider 209.

Figure 8:
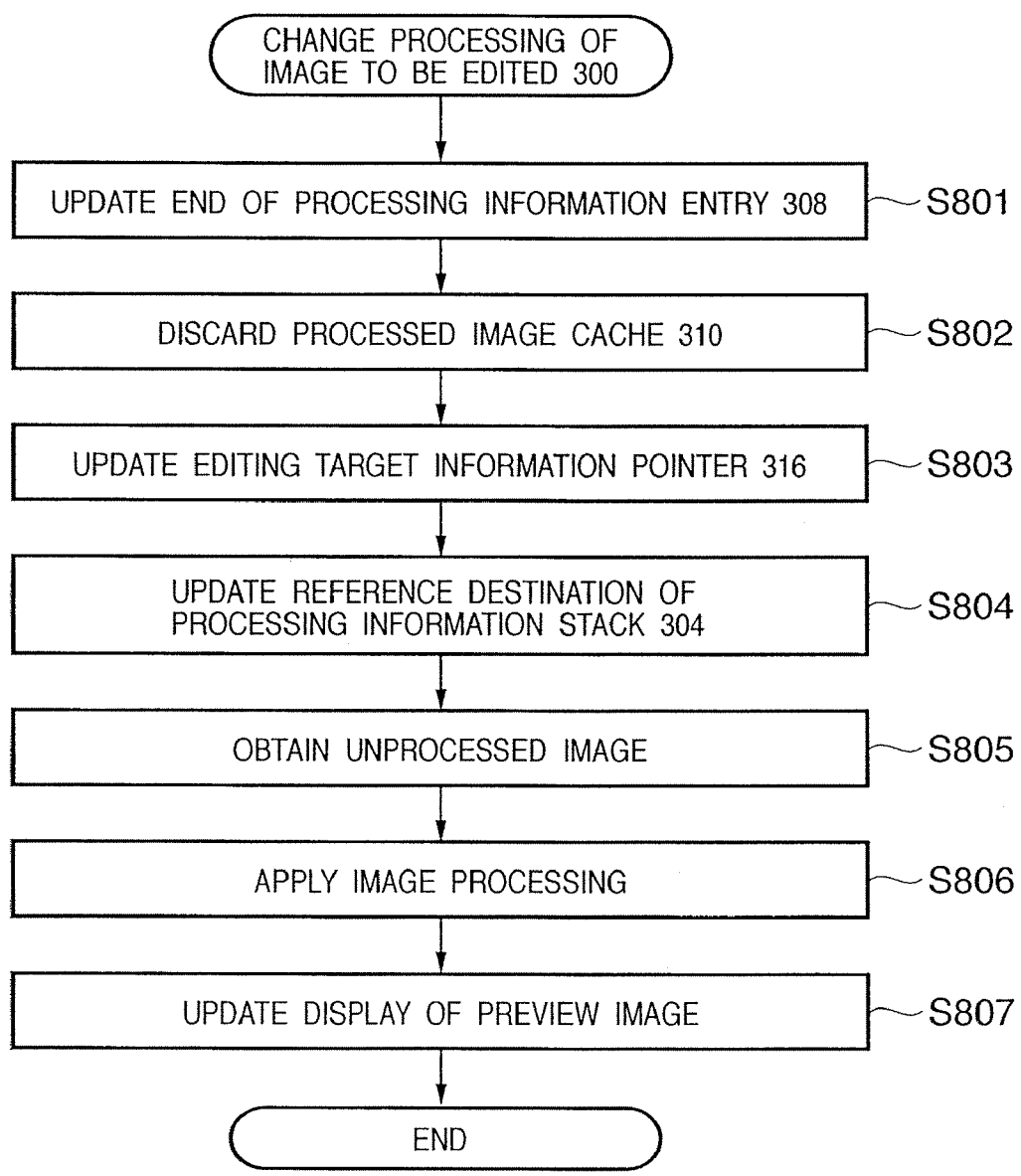
FIG. 8 is a flowchart showing an example of change processing of an image to be edited 300 corresponding to an embodiment of the present invention.

Next, processing performed when a file is designated by an application or when an image to be edited 300 is changed by the previous selection button 210 or the next selection button 211 will be described with reference to FIG. 8. FIG. 8 is a flowchart corresponding to an example of the relevant processing.

As shown in FIG. 8, in step S801, a processing information entry 308 which exists beyond processing information stack end position information 307 is discarded in regards to the processing information stack 304 of the image to be edited 300. In the subsequent step S802, in regards to the processing information stack 304 of the image to be edited 300, all processed image caches 310 for the processing information stack 304 are discarded. Furthermore, in step S803, an edit target information pointer 316 is updated so that the file entry 312 of a newly selected file is referenced. In step S804, the reference destination of the processing information stack 304 of the image to be edited 300 is updated so that the processing information stack 315 referenced by the edit target information pointer 316 is referenced.

In step S805, the file is decoded to obtain an unprocessed image 301. In step S806, image processing retained in the processing information stack 304 is applied to the unprocessed image 301 obtained in step S805 to generate a preview image 302. In step S807, the GUI state makes a transition to the fit mode 401, and the preview image 302 is fit-displayed. The flow of processing in which image processing is applied to generate the preview image 302 will be described later with reference to FIG. 9.

Next, undo/redo processing according to the present embodiment will be described. Undo refers to processing in which the image processing last applied is cancelled. In the present embodiment, undo processing involves modifying the processing information stack end position information 307 so that the last processing information entry 308 is referenced.

On the other hand, a redo operation is cancellation processing of undo. In the present embodiment, redo processing involves updating the processing information stack end position information 307 so that the next processing information entry is referenced instead of the processing information entry 308 currently being referenced.

This function allows processing to be repeated as many times as necessary in cases where image processing has been applied to the wrong coordinates or when processing results are not satisfactory.

Upon undo/redo processing or when a new file has been selected, it is necessary to perform update processing on the preview image 302. Update processing of the preview image 302 is performed by applying image processing on the unprocessed image 301 according to the processing information stack 304.

Figure 9:
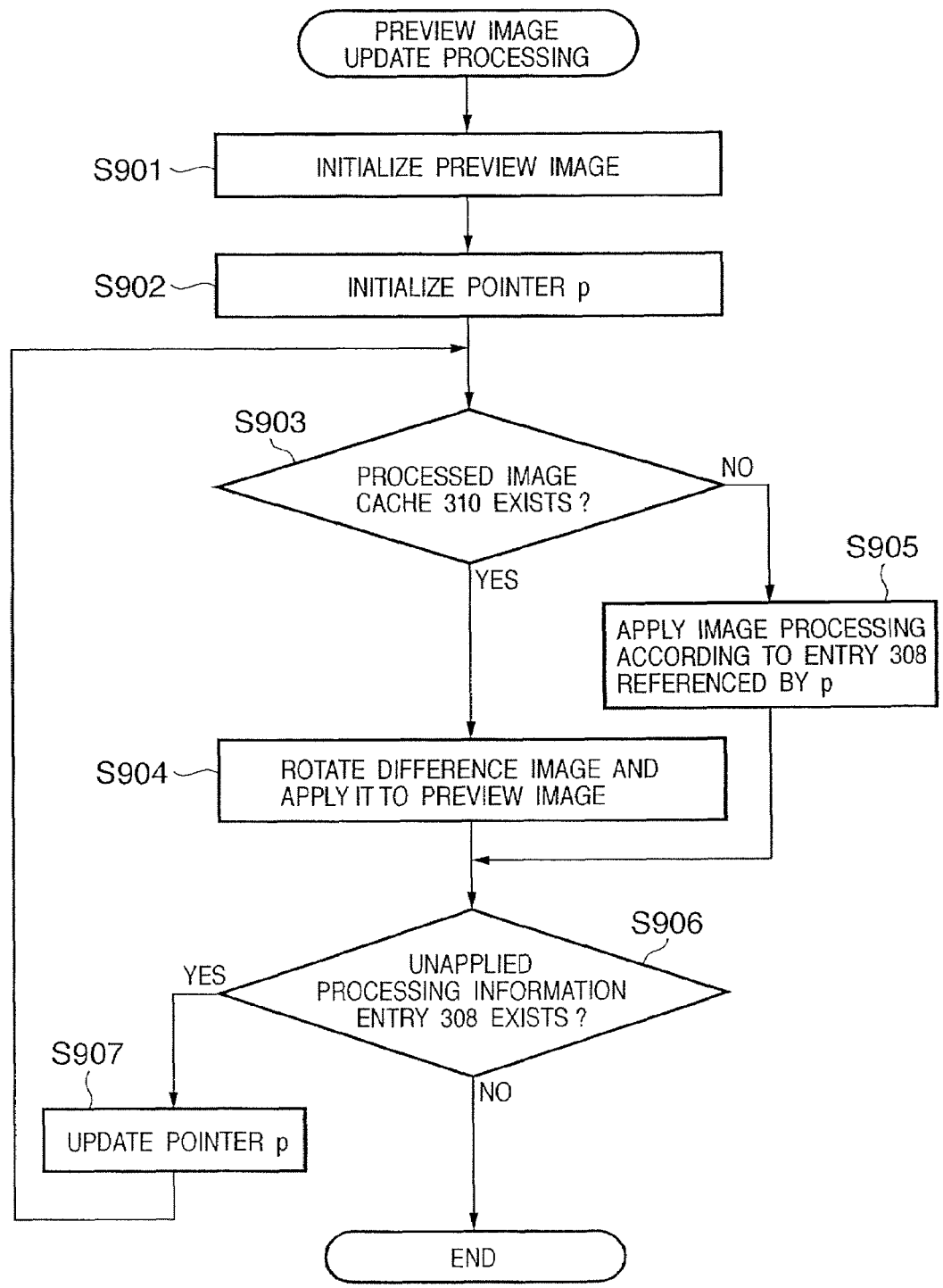
FIG. 9 is a flowchart showing an example of update processing of a preview image corresponding to an embodiment of the present invention.

A flowchart depicting the flow of update processing of a preview image is shown in FIG. 9. When the processing information stack 304 is empty, this processing is not applied.

In step S901, the unprocessed image 301 is copied after discarding the preview image 302, and the copy is deemed to be the new preview image 302. The preview image 302 is rotation-processed so that the image is aligned in the direction indicated by the image rotation information 303. In the subsequent step S902, the pointer p which references the processing information entry 308 referenced by the processing information stack 304 is initialized. In step S903, a determination is performed on whether a processed image cache 310 exists in the processing information stack 304 referenced by the pointer p. If a processed image cache 310 exists ("Yes" in step S903), the process proceeds to step S904. If not ("No" in step S903), the process proceeds to step S905.

In step S904, the image rotation information 303 is compared with the cache rotation information, and the difference image is rotated so that the image is aligned with the image direction designated by the image rotation information 303. The difference is then reflected onto the preview image 302, and the process proceeds to step S906. In step S905, image processing is applied to the preview image using processing parameters 309 of the processing information entry 308 referenced by the pointer p. However, before applying image processing, the copy relative coordinates and the coordinates stored in the application coordinates array are rotated in the direction indicated by the image rotation information. Image processing is then applied to the coordinates after rotation. After image processing is applied, the process proceeds to step S906.

In step S906, a determination is performed on whether a processing information entry 308 not yet applied exists. If such a processing information entry 308 exists ("Yes" in step S906), the process proceeds to step S907. If not ("No" in step S906), the process is terminated. In step S907, the pointer p is updated so that the pointer references the processing information entry 308 not yet applied, and the process returns to step S903.

Next, the save button 206 and the conversion button 207 will be described. When the save button 206 is pressed, a processing information stack 304 and image rotation information 303 is assigned to a file. Using this function, processing results may be saved without destroying original image data. When the conversion button 207 is pressed, image processing in accordance with the processing information stack 304 is applied to the original image data, and after rotating the image according to image rotation information 303, the file is saved as a new file. Applying the processing information stack 304 prior to rotation of the image is advantageous in that conversion of coordinates within the processing information stack 304 is no longer necessary. However, in the present embodiment, for the purpose of standardizing processing, image processing in line with the processing information stack 304 is applied by the processing shown in FIG. 9 after rotating the image according to the image rotation information 303.

Figure 10:
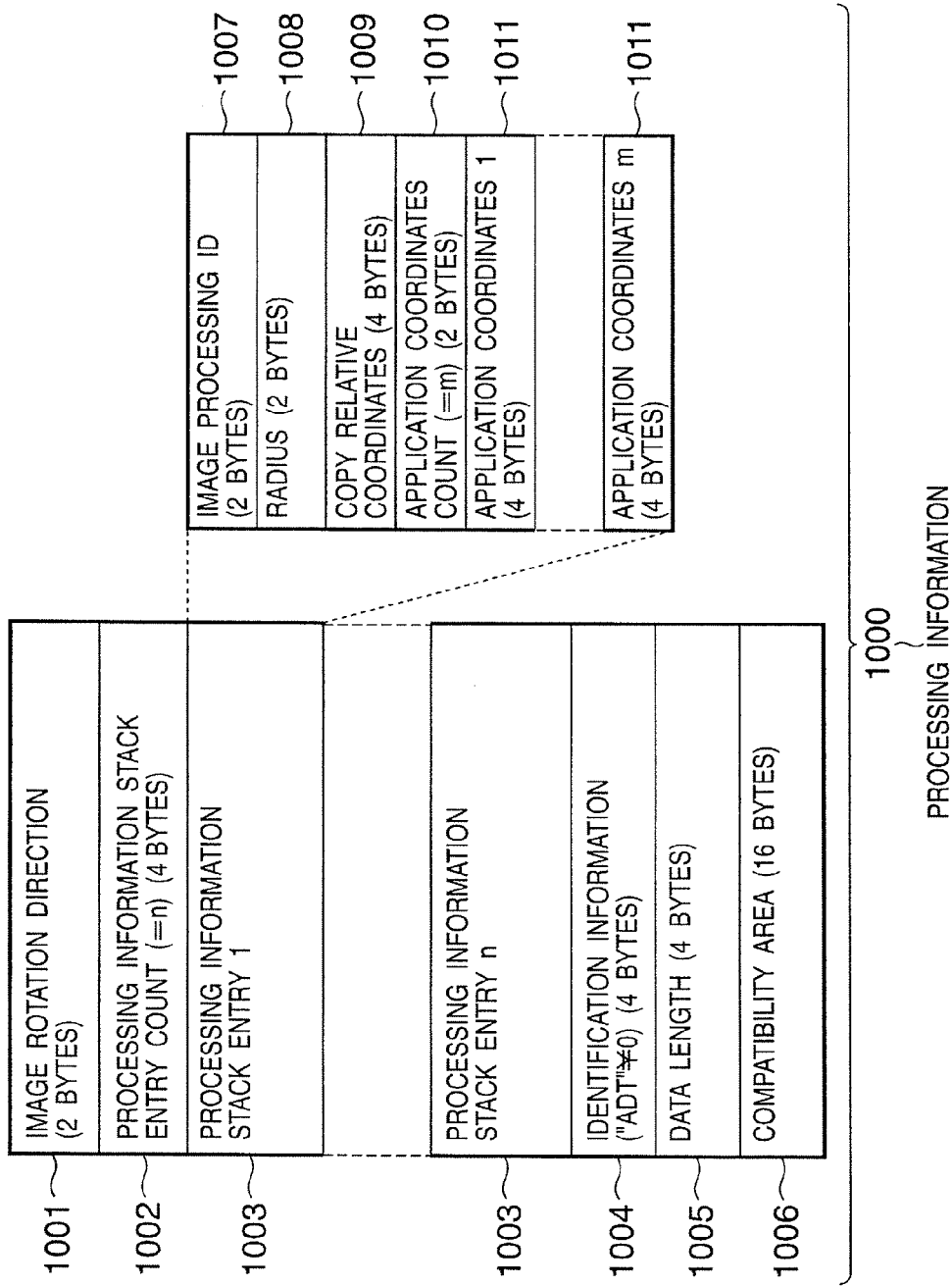
FIG. 10 is a diagram showing an example of a data format assigned by a save button 206 corresponding to an embodiment of the present invention.

An example of a data format assigned by the save button 206 is shown in FIG. 10. The data shown in FIG. 10 is referred to as processing information (1000). Processing history information of an image to be edited 300, to which image processing has been applied, is registered into processing information (1000). For the image rotation direction 1001, 2-byte values of 0 for a non-rotational state, 1 for a 90-degrees clockwise rotation, 2 for a 180-degrees rotation, and 3 for a 90-degrees counter-clockwise rotation are respectively stored. The processing information stack entry count 1002 is a 4-byte value, and stores the number of processing information stack entries. Retained in a processing information stack entry are: an image processing ID 1007, an application radius 1008, copy relative coordinates 1009 and application coordinates 1011 which are expressed by coordinate values prior to image rotation, and an application coordinates count 1010. Coordinates are 4-byte values with x coordinates and y coordinates respectively having 2-bytes, while the other values are 2-byte values. The value of the image processing ID stored in the processing parameters 309 of each processing information entry 308 is stored in the image processing ID.

The processing information 1000 may be safely assigned after the EOI (end of image) of JPEG data, or to the end of Tiff data or the end of a RAW data file. However, in some cases, the end of a RAW data file may contain special significance such as an identification code of the RAW file. In this light, a compatibility area 1006 which copies and records the last 16 bytes of a file prior to attaching the processing information 1000 thereto is provided in the last 16 bytes of the processing information 1000. In addition, in order to determine whether processing information 1000 already exists, identification information "ADT" ¥0 (1004) and data length 1005 are respectively stored as 4-byte values immediately before the compatibility area 1006.

Figure 11:
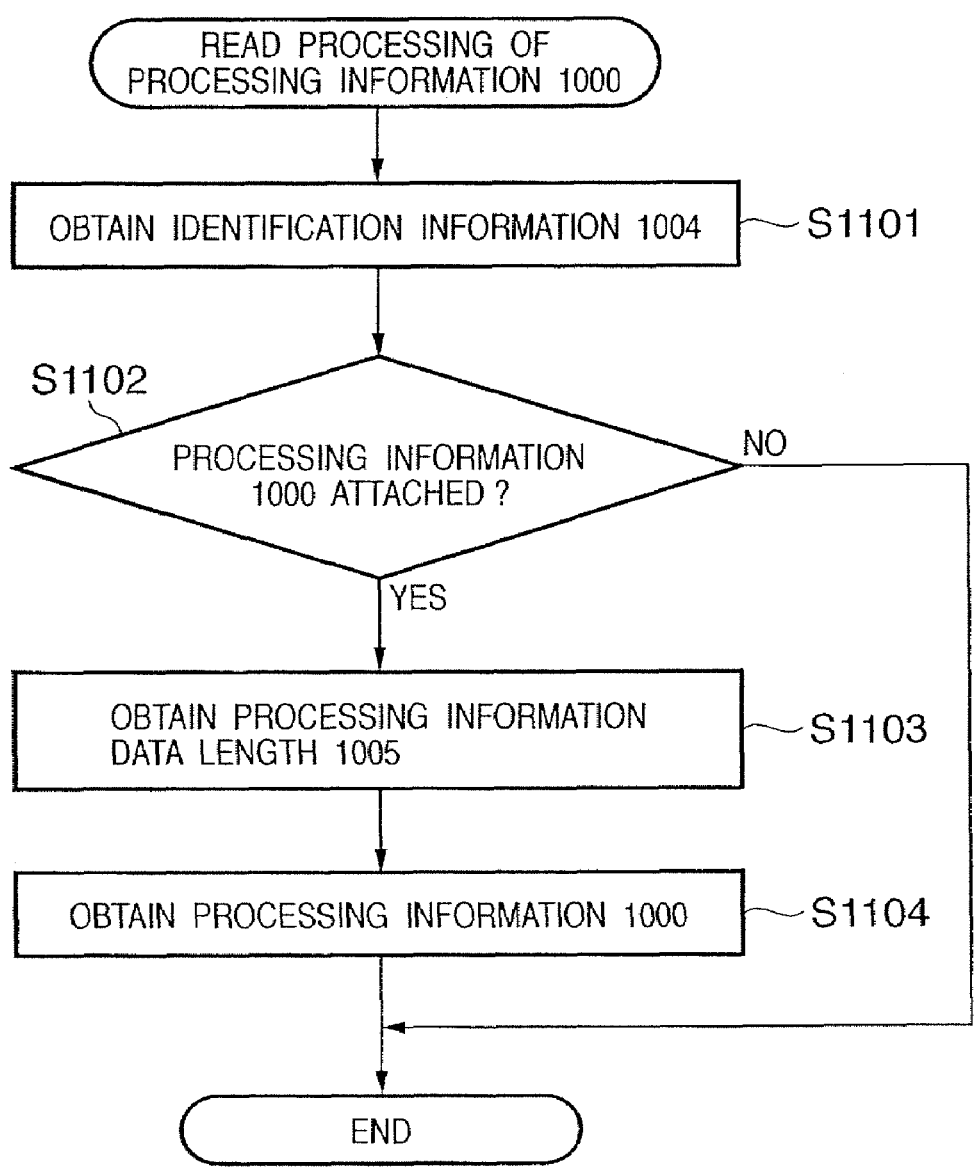
FIG. 11 is a flowchart showing an example of read processing of processing information 1000 corresponding to an embodiment of the present invention.

Next, read processing of the processing information 1000 will be described with reference to FIG. 11. FIG. 11 is a flowchart corresponding to an example of the relevant processing.

In step S1101, 4-byte's worth of data starting at the 24th byte from the file end, in other words, data corresponding to the identification information 1004, is first read. Next, in step S1102, based on whether the data read in step S1101 is "ADT" ¥0, a determination is performed as to whether processing information 1000 is attached to the image data. If it is determined that the processing information 1000 is attached ("Yes" in step S1102), the process proceeds to step S1103. If it is determined that the processing information 1000 is not attached ("No" in step S1102), the present read processing is terminated.

In step S1103, 4-byte's worth of data starting at the 20th byte from the file end is read, and the data length 1005 of the identification information 1000 is obtained. Next, in step S1104, data between a position that is separated from the file end by the data length 1005 of the processing information 1000, and the file end is read. The read data becomes processing information 1000.

By using an image editing program as described above, images may be processed without destroying image data to be edited and processed, and processing results thereof may be saved.

Finally, operations of the copy button 213 and the paste button 214 will be described. The copy button 213 is a button used for copying the processing information stack 304 of an image being edited onto a primary storage 102 and retaining the copied processing information stack 304. The paste button 214 is a button which becomes effective when a copy of a processing information stack 304 exists on the primary storage 102. When the button 214 is pressed, the processing recorded in the copy of the processing information stack 304 on the primary storage 102 is applied to the image being edited. After the processing is applied, the copy of the processing information stack 304 is discarded. This enables prevention of sudden increases in the processing information entry count due to repetition of copy and paste operations. A detailed description will be provided later.

When a plurality of images having approximately the same pictures exist, the time spent on processing operations may be reduced by performing image processing on a single image, and then applying the same processing on the other images. In the image editing program corresponding to the present embodiment, since editing procedures are retained in the form of a processing information stack 304, such processing may be realized by applying the processing information stack 304 itself to other images.

First, copy processing of a processing information stack 304 will be described. Copy processing of a processing information stack 304 refers to processing in which a processing information stack 304 of an image to be edited 300 is stored in a primary storage 102. However, when pasting a copied processing information stack 304, a resolution of a copy source image will be required to determine whether pasting will be performed. Therefore, the processing information stack 304 is retained separately. Information stored in the primary storage 102 comprises the processing information stack 304, image rotation information 303, and image resolution of the original image prior to rotation processing.

Next, paste processing of the processing information stack 304 will be described. Paste processing of a processing information stack 304 refers to processing in which the processing information stack 304 retained in the primary storage 102 by the above-mentioned copy processing is reflected onto the processing information stack 304 of the image to be edited 300.

Methods of reflection processing include a method involving appending the processing information stack 304 to be pasted onto the processing information stack 304 of the image to be edited 300, and a method in which the processing information stack 304 of the image to be edited 300 is discarded and replaced by the processing information stack 304 to be pasted. In the present embodiment, the latter will be used.

Figure 12:
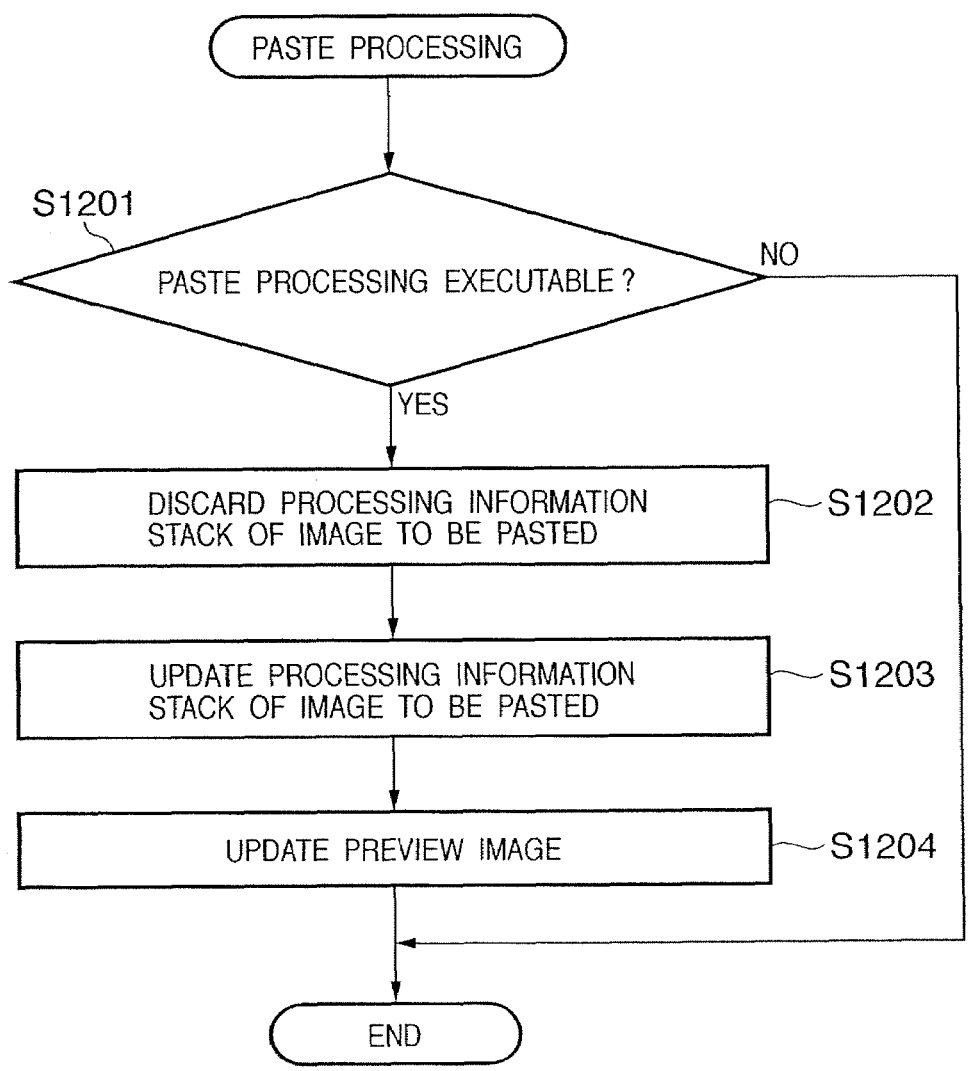
FIG. 12 is a flowchart showing an example of paste processing of processing information corresponding to an embodiment of the present invention.

Next, a flow of paste processing will be described with reference to FIG. 12. FIG. 12 is a flowchart corresponding to an example of paste processing.

In step S1201, paste processing execution determination is performed. In the present embodiment, the image resolution of an original image prior to rotation stored in the primary storage 102 is compared with the image resolution of the image to be pasted prior to rotation, and paste processing is executed only when the widths and heights of the images match. In the event that paste processing is not executed ("No" in step S1201), the process is terminated. When it is determined that paste processing is executable ("Yes" in step S1201), the process proceeds to step S1202. In step S1202, the processing information stack 304 of the image to be pasted is discarded.

Furthermore, in step S1203, the processing information stack 304 in the primary storage 102 is copied, and is deemed as the processing information stack 304 of the image to be pasted. In step S1204, the preview image update processing shown in FIG. 9 is performed on the image to be pasted to reconfigure the preview image and the processed image cache, and the process is terminated.

First Embodiment

In the above-described embodiment which forms the basis of the present invention, a case was explained in which the display mode was switched back to the fit mode 401 (for instance, step S807 in FIG. 8) when either a file was designated by an application or when an image to be edited 300 was changed using the previous selection button 210 or the like. Alternatively, in the present first embodiment, an appropriate area is displayed without switching display modes.

In addition, in the above-described embodiment, a GUI used for performing dust reduction processing when dust attached to a sensor is incorporated into image data has been described. Although there are cases where dust on the sensor moves slightly due to impact caused by the shutter and the like, it is well-known that there is a high probability that the dust will be incorporated in the same position through consecutively shot image data.

In consideration of the above, for the present embodiment, display images are switched while maintaining the coordinates prior to image rotation when an instruction to change an image to be edited 300 is received through file designation by the user or through the previous selection button 210 and the like. This enables the image to be edited 300 to be displayed so that dust is displayed in the same position as the previously displayed dust even after switching to other images.

By providing such an image switching method, editing operations may be performed while focusing on dust that is displayed in the same position across a plurality of images.

Figure 13:
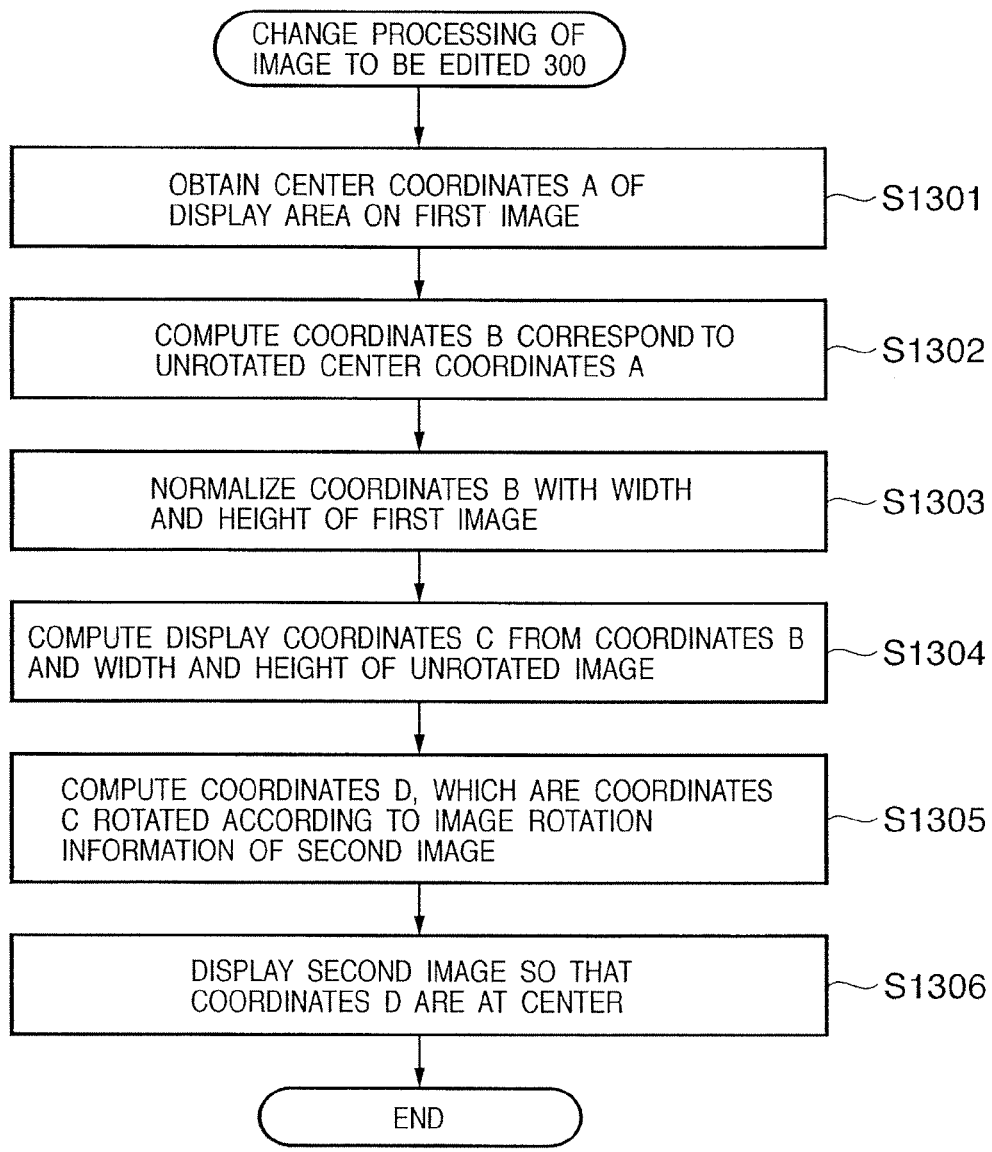
FIG. 13 is a flowchart showing an example of processing upon changing an image to be edited 300 corresponding to a first embodiment of the present invention.

A flowchart depicting a flow of processing which is performed when the image to be edited 300 is changed, corresponding to the present embodiment, is shown in FIG. 13. However, change processing of the image to be edited during fit mode 401 is the same as the processing of the previous embodiment (refer to FIG. 8). In the following description, the image to be edited 300 which had been last selected will be referred to as the "first image", while the newly selected image 300 will be referred to as the "second image". It is assumed that the first and second images have already been rotated according to image rotation information 303. The respective images prior to rotation will be referred to as the "first unrotated image" and the "second unrotated image".

In step S1301, center coordinates A of the displayed partial area of the first image are obtained. The center coordinates A are not coordinates within the displayed area, but are instead coordinates in the entire first image. Next, in step S1302, image rotation information of the first image is used to compute coordinates B on the first unrotated image which corresponds to the center coordinates A. The coordinates B may be computed by rotating the center coordinates A in a direction which negates the rotation direction indicated by the image rotation information.

In step S1303, coordinates B (XB,YB) are normalized using the next equation. W1 and H1 are, respectively, the width and the height of the first unrotated image. The coordinates after normalization are expressed as (X'B, Y'B).

$$X'B = XB/W1$$

$$Y'B = YB/H1$$

Next, in step S1304, the center coordinates C (XC, YC) on the second unrotated image are computed using the width W2 and height H2 of the second unrotated image.

$$XC = W2 * X'B$$

$$YC = H2 * Y'B$$

In step S1305, coordinates D, which are the center coordinates C rotated according to image rotation information 303 of the second image, is obtained. In step S1306, the second image is displayed so that the coordinates D become the center of the display area.

By performing such processing, the image to be edited 300 may be switched while maintaining the relative position on the image in its unrotated state. Therefore, in the case where a plurality of images shot by the same camera body is switched, approximately the same position will be the center of the display area on the sensor regardless of the rotation direction of the images and the portion on which image processing is to be performed may be displayed. Therefore, dust reduction processing may be performed in an efficient manner.

As seen, according to the present embodiment, a processing information stack 304 created during dust reduction processing of the image to be processed 300 may be applied to a new image to be edited 300. This allows the same image processing that was performed on the processed image to be performed on the new image to be processed 300, and enables dust reduction processing to be performed in an efficient manner.

Second Embodiment

In the present embodiment, a method will be described in which dust reduction processing is performed in a more efficient manner by adding a display position assist function to the first embodiment. In addition to the configuration of the first embodiment, the present embodiment comprises a display coordinates table, a display coordinates table update flag, and a display position ID. A display position ID is information corresponding to a sequence in which image processing has been performed.

Figure 14:
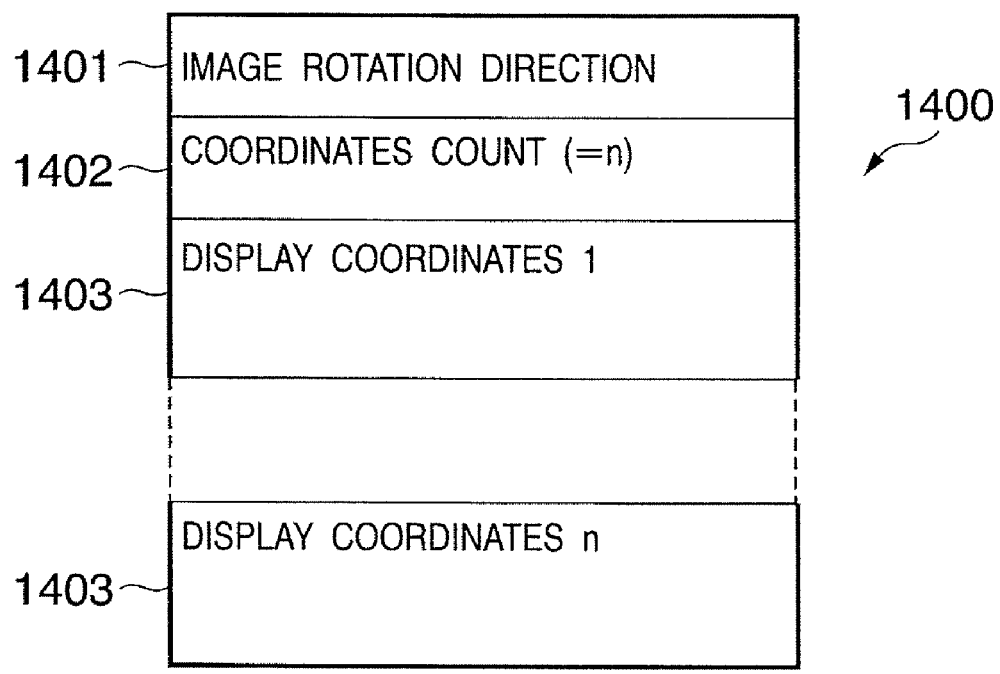
FIG. 14 is a diagram showing an example of a display coordinates table 1400 corresponding to a second embodiment of the present invention.
Figure 15:
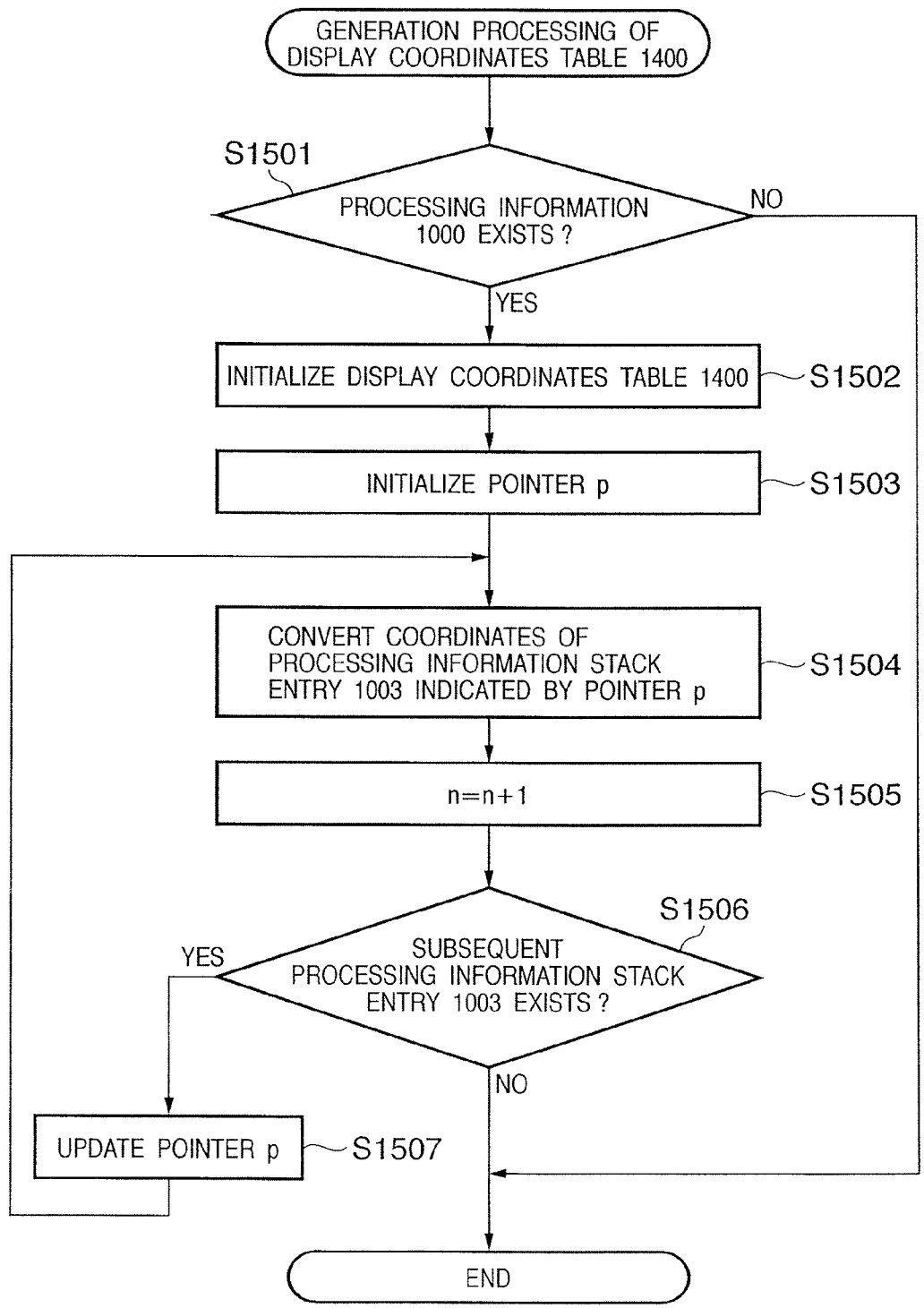
FIG. 15 is a flowchart showing an example of processing for generating the display coordinates table 1400 from a processing information stack 304 corresponding to the second embodiment of the present invention.

A display coordinates table is shown in FIG. 14. To begin with, a display coordinates table 1400 includes an image rotation direction 1401 of the image to be edited 300. The display coordinates table 1400 stores a double-precision floating-point number display coordinates array 1403 in which a coordinates array retrieved from the processing information stack 304 of the image to be edited 300 is normalized to [0.0, 1.0] using the width and height of the image to be edited 300, and a coordinates count 1402. FIG. 15 shows a flow of processing in which the display coordinates table 1400 is generated from the processing information 1000.

In step S1501, a determination is performed on whether processing information entry 1000 exists for the image to be edited 300. If such a processing information entry 1000 exists ("Yes" in step S1501), the process proceeds to step S1502. On the other hand, if such a processing information entry 1000 does not exist ("No" in step S1501), the process is terminated. In step S1502, initialization processing of the display coordinates table 1400 is performed. More specifically, a value indicating a rotation direction of the image to be edited 300 is stored at the top of the display coordinates table 1400. It is assumed that the value indicating image rotation direction is the same as the processing information 1000 shown in FIG. 10. In addition, the coordinates count n is initialized to 0 to empty the display coordinates array.

Next, in step S1503, a pointer p is initialized so that the top of the processing information stack entry 1003 of the processing information 1000 is indicated by the pointer p. In step S1504, coordinates are obtained from the processing information stack entry 1003 indicated by the pointer p and are converted. When there is a plurality of coordinates, the first coordinates are used. Conversion processing is performed using the following equation:

$$X' = X/(W-1)$$

$$Y' = Y/(H-1)$$

where X, Y are coordinates obtained from the processing information stack entry 1003, W, H are, respectively, the width and height of the image to be edited 300, and X', Y' are coordinates after conversion. The converted coordinates are added to the bottom of the display coordinates table 1400.

In step S1505, the coordinates count is incremented by 1. In step S1506, a determination is performed on whether an entry subsequent to the processing information stack entry 1003 indicated by the pointer p exists. If such an entry does not exist ("No" in step S1506), the process is terminated. On the other hand, if such a processing information entry exists ("Yes" in step S1506), the process proceeds to step S1507. In step S1507, the pointer p is updated so that the pointer p now indicates the entry subsequent to the processing information stack entry 1003 indicated by the pointer p, and the process returns to step S1504.

Next, update processing of the display coordinates table 1400 will be described. When an image to be edited 300 is loaded, the display coordinates table update flag is turned off. In addition, in the case where either the lack area interpolation processing of step S603 shown in FIG. 6 or the blend processing of step S1606 shown in FIG. 16 is executed, the display coordinates table update flag is turned on. In the case where either the image to be edited 300 is changed by the previous selection button 210 or the next selection button 211, or when the display coordinates table update flag is turned on, the display coordinates table 1400 is updated by the processing shown in FIG. 15, and the display position ID is initialized to −1.

This enables the display coordinates table 1400 to be generated from the processing information stack 304 of the last edited image. Since such an implementation prevents updating of the display coordinates table 1400 until image processing is performed even when images are sequentially displayed for image selection, the user may perform operations while giving consideration to the contents registered in the display coordinates table 1400.

Figure 18:
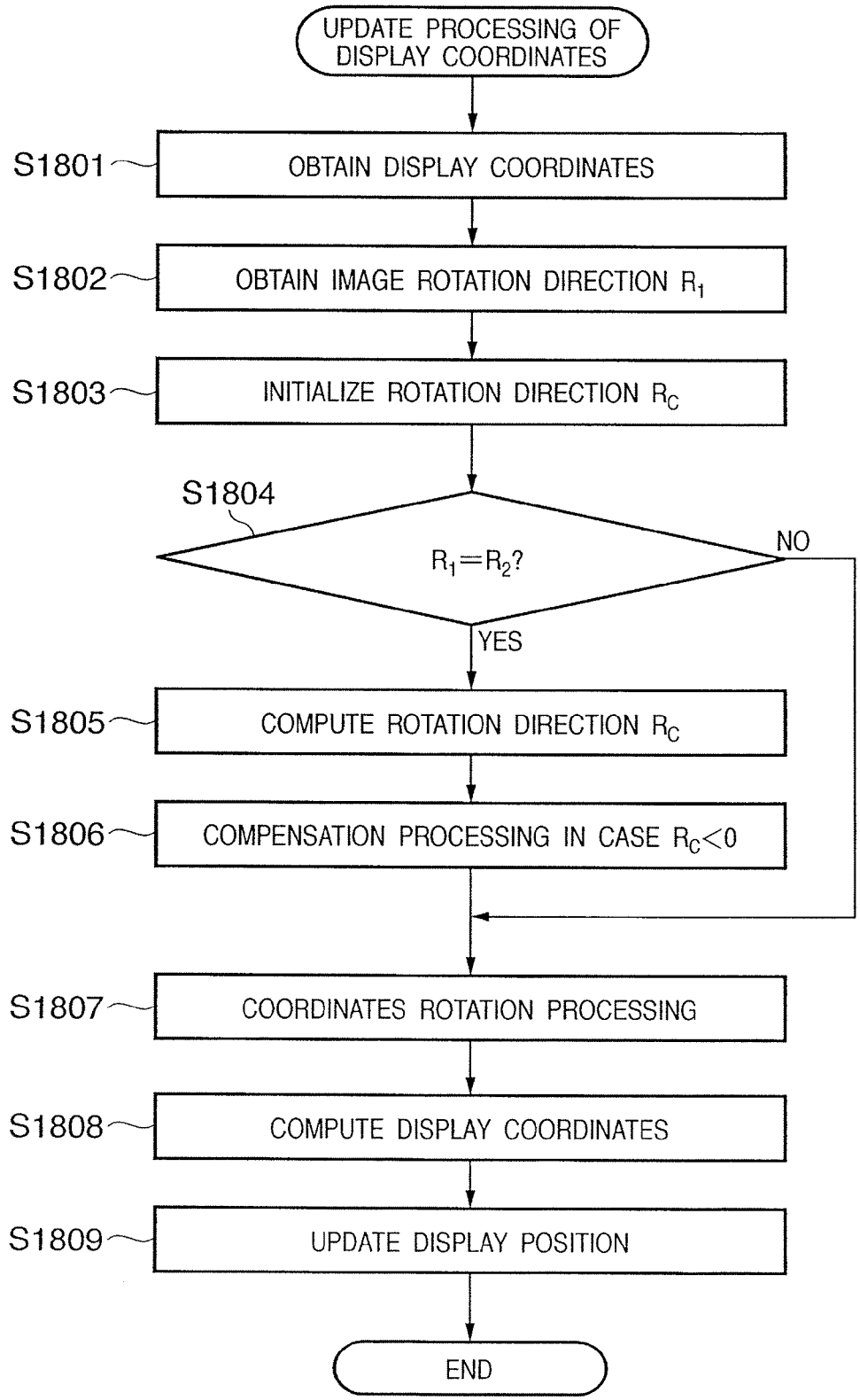
FIG. 18 is a flowchart showing an example of update processing of display coordinates corresponding to the second embodiment of the present invention.

Lastly, update processing of a display position will be described. In the present embodiment, display coordinates are computed using coordinates computed using the display position ID and the display coordinates table 1400 as well as the width and height of the image to be edited 300, and the display position is updated so that the display coordinates are at the center of the image display area 201. The flow of update processing of display coordinates will be described below with reference to FIG. 18. FIG. 18 is a flowchart corresponding to an example of update processing of display coordinates.

In step S1801, if the value obtained by adding 1 to the display position ID may be expressed by j, the jth coordinates of the display coordinates array are obtained. Assume that the coordinates are x, y. In step S1802, an image rotation direction 1461 is obtained from the display coordinates table 1400. It is assumed that the value of the obtained rotation direction 1401 is R1. In step S1803, Rc, which is a rotation direction to be computed afterwards, is initialized to 0. In step S1804, a determination is performed on whether R1, the image rotation direction obtained in step S1802, is equal to the image rotation direction of the image to be edited 300 itself (which will be expressed as R2). If R1 and R2 are not determined to be equal ("No" in step S1804), the process proceeds to step S1808. On the other hand, if it is determined that R1 is equal to R2 ("Yes" in step S1804), the process proceeds to step S1805. In step S1805, the rotation direction Rc of x, y is computed by Rc=R2−R1.

Next, in step S1806, if Rc is less than 0, it is assumed that Rc=4+Rc. Then, the process proceeds to step S1807. Once compensation of Rc is concluded, the process proceeds to step S1807.

In step S1807, rotation processing is performed according to Rc. Specific calculation formulas for coordinates after rotation x′, y′ are as follows:

When Rc=0, $x'=x$ $y'=y$.

When Rc=1, $x'=1.0-y$

When Rc=2, $x'=1.0-x$ $y'=1.0-y$.

When Rc=3, $x'=y$ $y'=1.0-x$.

In step S1808, display coordinates are computed by multiplying x′, y′ by the image width W and the image height H of the image to be edited 300. In other words, the display coordinates (p, q) may be expressed by the following equation:

$p=x'\times W$ $q=y'\times H$

In step S1809, the display position is updated so that the coordinates computed in step S1808 is at the center.

When the Ctrl key and the "f" key are simultaneously pressed, the display position ID is set to +1. Alternatively, when the Ctrl key and the "b" key are simultaneously pressed, the display position ID is set to −1. When the display position ID assumes a negative number, the display ID is set to a value obtained by subtracting 1 from a display coordinates count (1402) n in the display coordinates table 1400. In addition, when the display position ID is equal to or exceeds the display coordinates count (1402) n in the display coordinates table 1400, the display ID is set to 0. When the display ID is changed, the processing shown in FIG. 18 is executed to perform updating of the display position.

Figure 19:
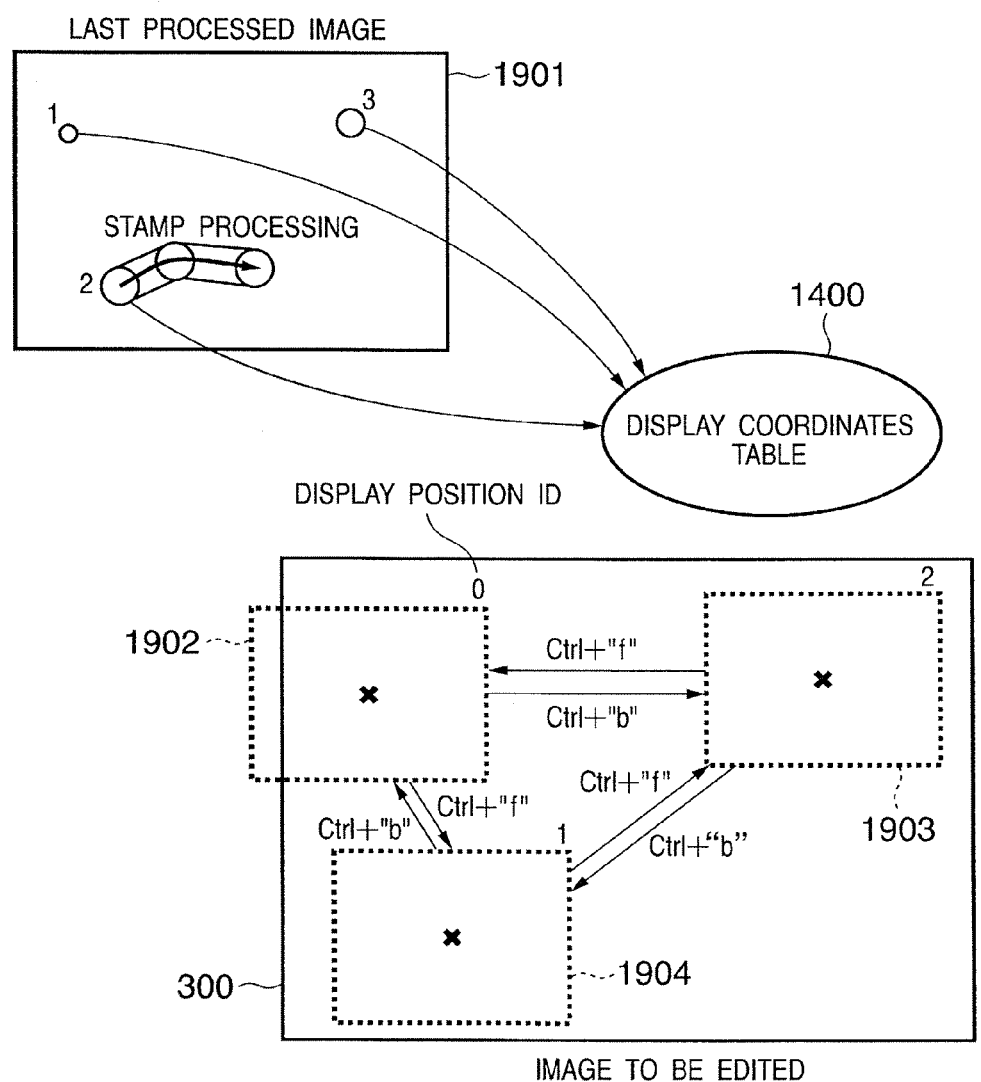
FIG. 19 is a diagram showing an example of a display position assist function corresponding to the second embodiment of the present invention.

A relationship between processing information 1000 and the display position is shown in FIG. 19. Numerals on the last processed image 1901 represent an operation sequence. Coordinates are registered into the display coordinates table 1400 in the sequence of editing operations for the last processed image 1901, and are used to change the display position of the image to be edited 300. Frames 1902 to 1904, expressed as dotted lines on the image to be edited 300, indicate a range displayed in the display area 201. The numerals attached to the top right of the dotted line-frames match the display position ID. By simultaneously pressing the Ctrl key and the "f" key or the Ctrl key and the "b" key, the display position ID is updated, and a position corresponding to the display position ID is displayed. In particular, since an edit processing position is always displayed at the center of a display position, positions to be modified may be identified more easily, thereby increasing operation efficiency.

As shown, by displaying processed positions of the last edited image 1901 in ascending and descending orders, it is no longer necessary to locate dust positions for every image. In addition, by taking into consideration rotation information when displaying processing position, image processing may be performed without paying attention to the rotation direction of an image.

Third Embodiment

In the present embodiment, a description will be provided on the expansion of the display position assist function described in the second embodiment. Image editing apparatuses corresponding to the afore-mentioned first and second embodiments are configured to display areas outside of an image during same size mode. However, there are many applications which do not display outside-of-image areas even in same size mode when the size of the image to be edited is greater than the display area size. In such cases, as shown in FIG. 20, display positions are controlled so that no outside-of-image areas exist.

FIG. 20 is a diagram showing an outline of display position compensation processing. In FIG. 20, reference numeral 300 denotes an image to be edited. Reference numeral 2001 denotes coordinates designated as the center of the display area within the image to be edited 300. The display area designated based on the coordinates 2001 will resemble the area shown as reference numeral 2002. However, the display area 2002 has an area which is outside of the image to be edited 300. Thus, it is possible to perform compensation so that the display area will fit inside the image to be edited 300 by moving the same as indicated by reference numeral 2003.

As described in the first embodiment, the present embodiment similarly allows transition from a fit mode to a same size mode by either double-clicking an image displayed in the fit mode, or by pressing the display mode transition button 204. Below, a flow of processing according to the present embodiment will be described for a case where a transition from the fit mode to the same size mode is made by double-clicking an image.

Figure 21:
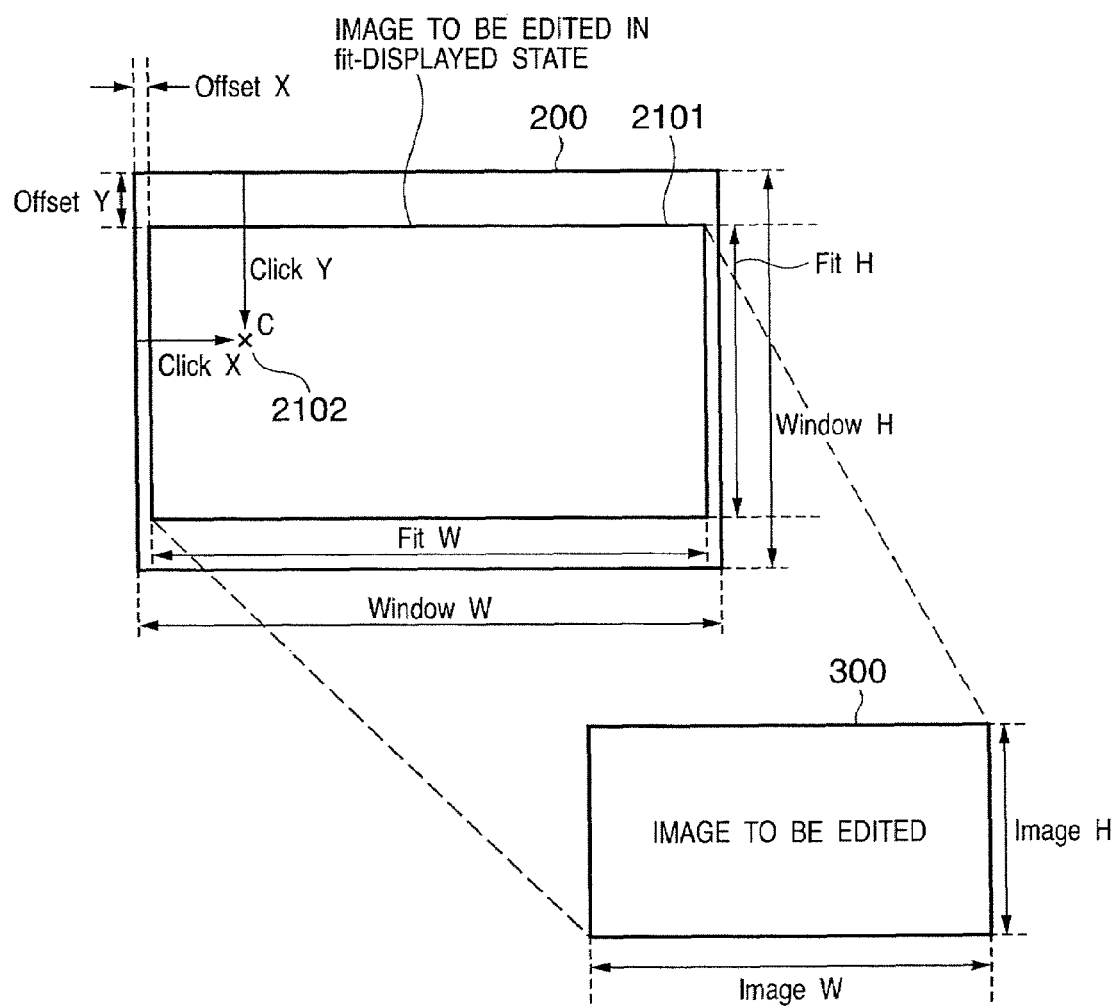
FIG. 21 is a diagram showing display parameters during a fit display corresponding to a third embodiment of the present invention.

Parameters of the display coordinates system in a fit display state are as shown in FIG. 21. It is assumed that all coordinate systems use the top left corner as their reference points, and the abscissae are the x axes and the ordinates are the y axes. It is also assumed that the rightward direction on the x axes and the downward direction on the y axes are positive directions. The width and height of the image display area 201 shown in FIG. 2 are respectively expressed as WindowW and WindowH, while the width and height of the image to be edited are respectively expressed as ImageW and ImageH. In addition, the width and height of the display size of the fit-displayed display image 2101 are respectively expressed as FitW and FitH, and the coordinates C of a clicked position using the top left of the image display area 201 as the reference point are expressed as C=(ClickX, ClickY).

Figure 22A:
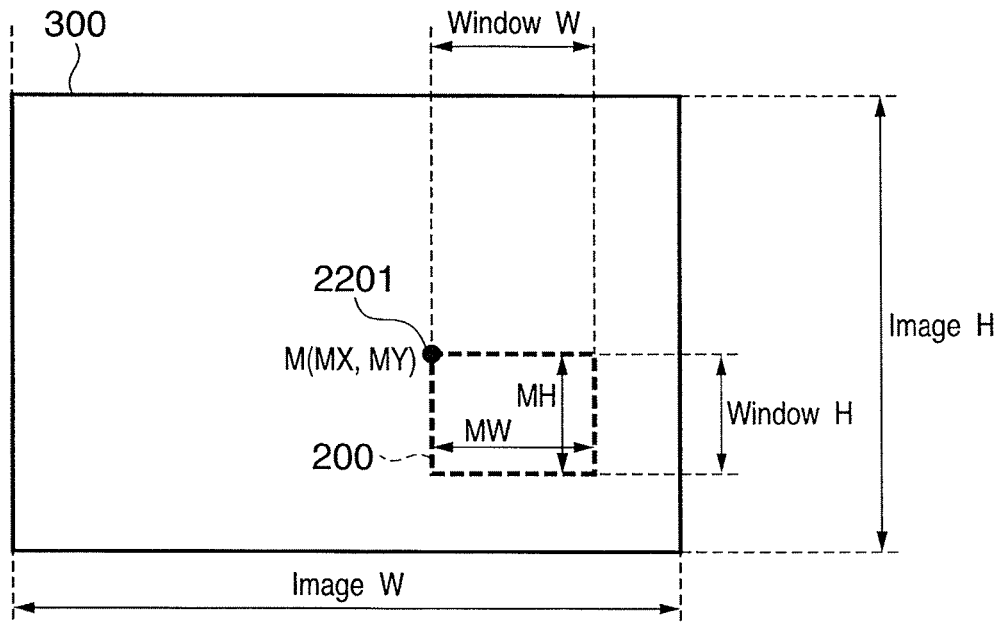
FIGS. 22A and 22B are diagrams showing display parameters during same size display corresponding to the third embodiment of the present invention.
Figure 22B:
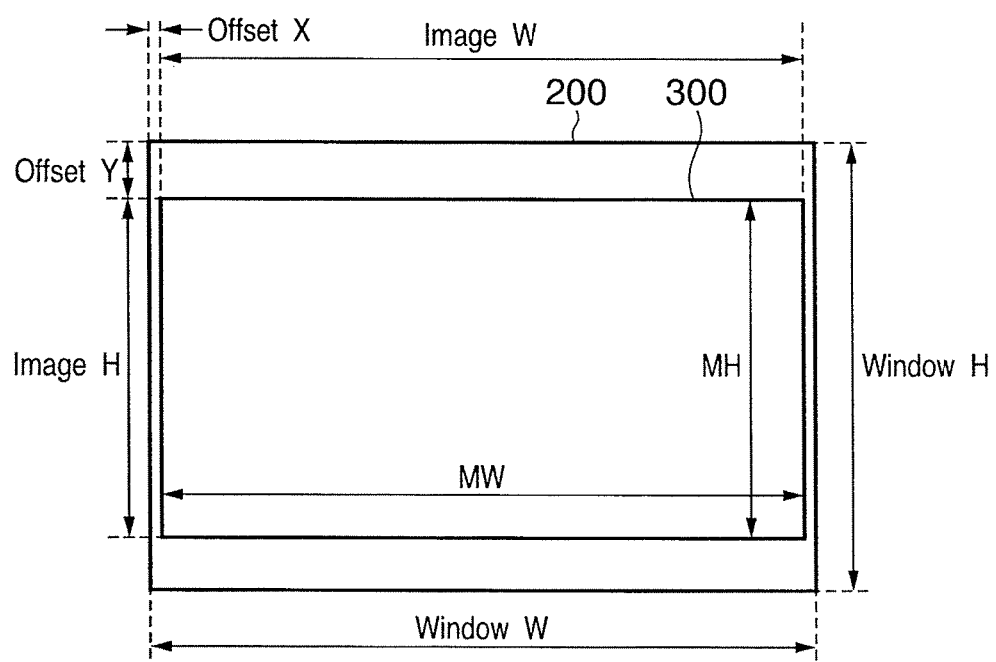

Next, parameters of the display coordinates system in a same size display state are as shown in FIGS. 22A and 22B. The method of thought in regards to the coordinates system is as the same as for the fit display state shown in FIG. 21. In the present embodiment, as shown in FIG. 22A, a portion of the image to be edited will be displayed when the width or the height of the image display area 201 is smaller than the width or the height of the image to be edited 300. The top left corner 2201 of the display area for the image to be edited 300 will be expressed as coordinates M (MX, MY), while the width and height of an area displayed on the image to be edited are respectively MW and MH.

On the other hand, as shown in FIG. 22B, the image to be edited is displayed to be centered in the image display area 201 when the width or the height of the image display area 201 is larger than the width or the height of the image to be edited 300. In this case, the offset values of the image display position will be respectively expressed as OffsetX for the x axis direction and OffsetY for the y axis direction.

In other words, the range of the coordinates M for the image to be edited 300 may be expressed as: $0 \leq MX \leq ImageW-WindowW$, $0 \leq MY \leq ImageH-WindowH$. While a setting processing of the image display area 201 will be described below using the coordinates M as an example, the coordinates M are merely an example of an indicator used to identify the position of the image display area 201. In other words, the image display area 201 may be set based on the bottom left, top right, bottom right or center of the area. In such cases, processing similar to that described below may be performed.

Figure 23:
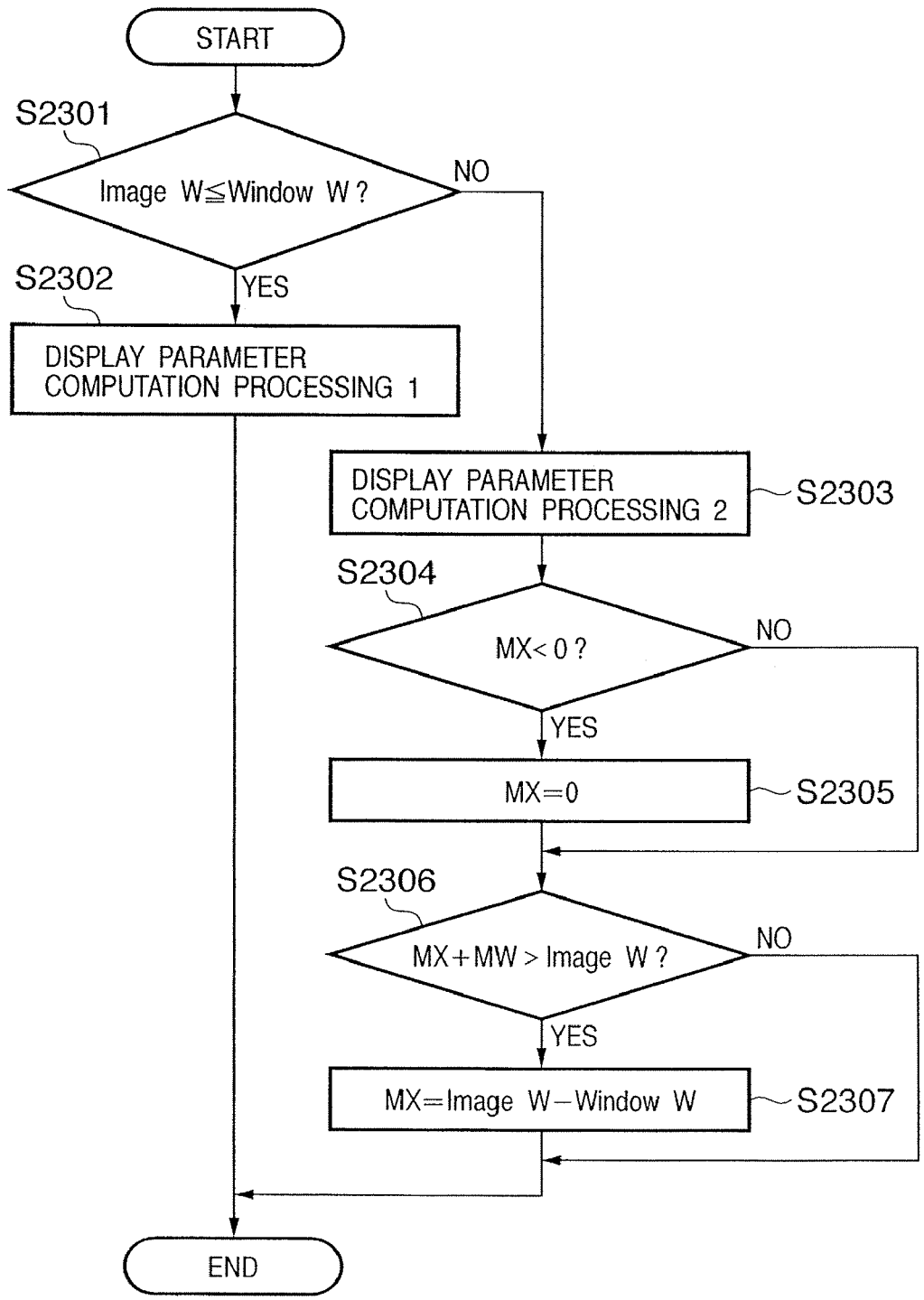
FIG. 23 is a flowchart showing a flow of computation processing of an X-axis direction display parameter corresponding to the third embodiment of the present invention.

Next, a detailed description of the computation processing of the display parameters OffsetX, MX and MW will be provided with reference to the flowchart shown in FIG. 23.

First, in step S2301, a determination is performed on whether the width ImageW of the image to be edited 300 is equal to or less than the width WindowW of the image display area 201. If ImageW is equal to or less than WindowW ("Yes" in step S2301), the process proceeds to step S2302. On the other hand, if ImageW is not equal to or less than WindowW ("No" in step S2301), the process proceeds to step S2303.

In step S2302, when the width of the image to be edited 300 is equal to or less than the width of the image display area 201, display parameters are computed based on the following equation as display parameter computation processing 1.

$$OffsetX=(WindowW-ImageW)/2$$

$$MX=0$$

$$MW=ImageW$$

After the display parameters are computed in step S2302, the process is terminated.

Next, in step S2303, when the width of the image to be edited 300 exceeds the width of the image display area 201, display parameters are computed based on the following equation as display parameter computation processing 2.

$$OffsetX=0$$

$$MX=(ClickX/WindowW) \times ImageW-WindowW/2$$

$$MW=WindowW$$

After the display parameters are computed in step S2303, the process proceeds to step S2304. In step S2304, a determination is performed on whether the computed MX described above is negative. If MX is a negative value ("Yes" in step S2304), since the image display area 201 will extend outside of the image to be edited 300, the process proceeds to step S2305 to set MX to 0. The process then proceeds to step S2306. On the other hand, if MX is equal to or greater than 0 ("No" in step S2304), the process proceeds to step S2306.

In step S2306, a determination is performed on whether the sum of MX and MW will exceed the width ImageW of the image to be edited 300. If the sum does not exceed ImageW ("No" in step S2306), the process is terminated as is. On the other hand, if the sum exceeds ImageW ("Yes" in step S2306), since the image display area 201 will extend outside of the image to be edited 300, MX is compensated for in step S2307 using the following equation, and the process is terminated.

$$MX=ImageW-WindowW$$

This compensation enables the image display area 201 to be fitted inside the image to be edited 300.

Figure 24:
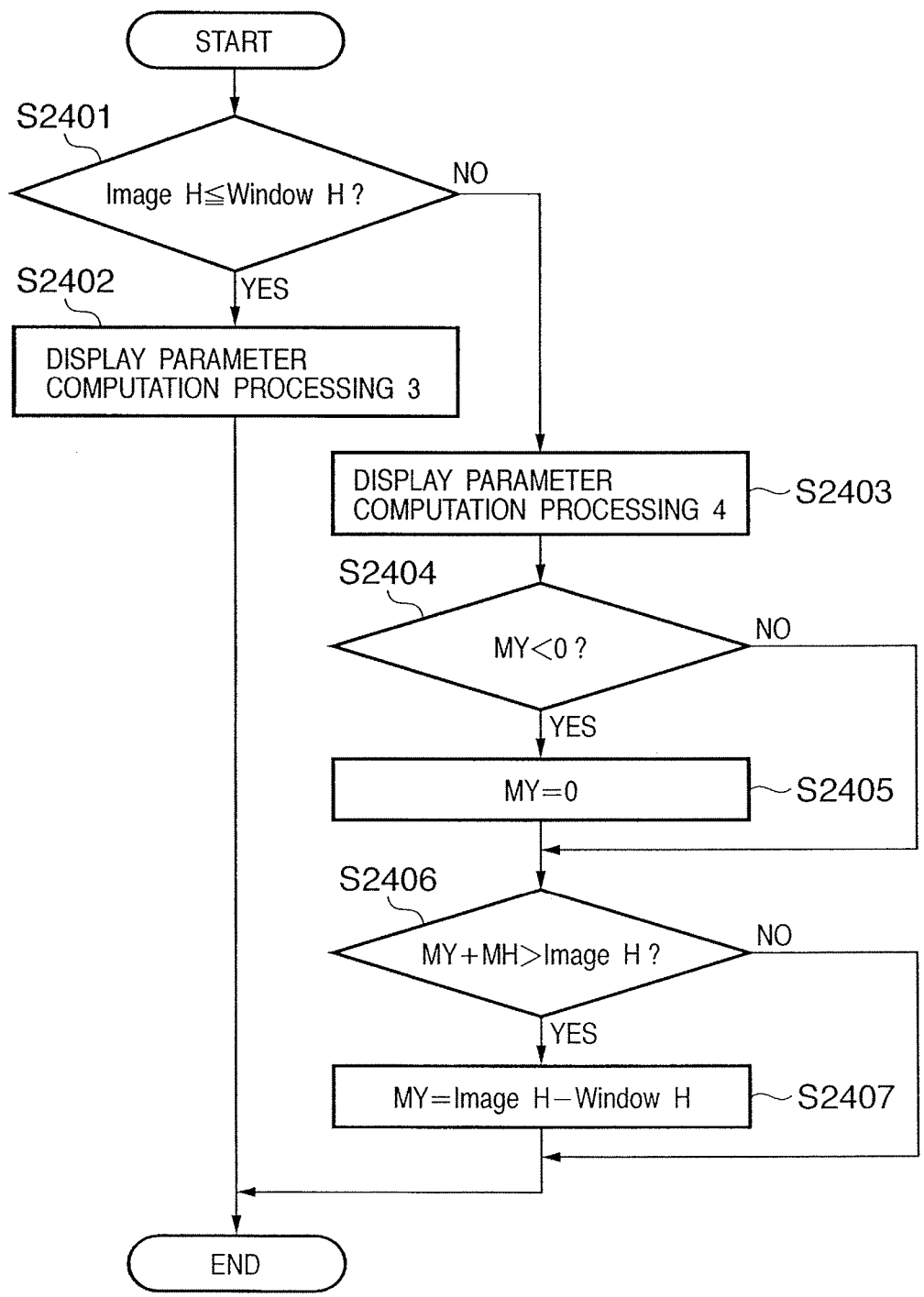
FIG. 24 is a flowchart showing a flow of computation processing of a Y-axis direction display parameter corresponding to the third embodiment of the present invention.

Next, a detailed description of the computation processing of the display parameters OffsetY, MY and MH will be provided with reference to the flowchart shown in FIG. 24.

First, in step S2401, a determination is performed on whether the height ImageH of the image to be edited 300 is equal to or less than the height WindowH of the image display area 201. If ImageH is equal to or less than WindowH ("Yes" in step S2401), the process proceeds to step S2402. On the other hand, if ImageH is not equal to or less than WindowH ("No" in step S2401), the process proceeds to step S2403.

In step S2402, when the height of the image to be edited 300 is equal to or less than the height of the image display area 201, display parameters are computed based on the following equation as display parameter computation processing 3.

$$OffsetY=(WindowH-ImageH)/2$$

$$MY=0$$

$$MH=ImageH$$

After the display parameters are computed in step S2402, the process is terminated.

Next, in step S2403, when the height of the image to be edited 300 exceeds the height of the image display area 201, display parameters are computed based on the following equation as display parameter computation processing 4.

OffsetY=0

$MY=(ClickY/WindowH) \times ImageH - WindowH/2$

MH=WindowH

After the display parameters are computed in step S2403, the process proceeds to step S2404. In step S2404, a determination is performed on whether the computed MY described above is negative. If MY is a negative value ("Yes" in step S2404), since the image display area 201 will extend outside of the image to be edited 300, the process proceeds to step S2405 to set MY to 0. The process then proceeds to step S2406. On the other hand, if MY is equal to or greater than 0 ("No" in step S2404), the process proceeds to step S2406.

In step S2406, a determination is performed on whether the sum of MY and MH will exceed the height ImageH of the image to be edited 300. If the sum does not exceed ImageH ("No" in step S2406), the process is terminated as is. On the other hand, if the sum exceeds ImageH ("Yes" in step S2406), since the image display area 201 will extend outside of the image to be edited 300, MY is compensated for in step S2407 using the following equation, and the process is terminated.

$MY=ImageH - WindowH$

This compensation enables the image display area 201 to be fitted inside the image to be edited 300.

As seen, the position of the image display area 201 in regards to the image to be edited 300 may be compensated for in at least either in the direction of the width or the direction of the height of the image to be edited 300 so that only the image to be edited 300 is included in the image displayed in the image display area 201. This enables the display area to be set so that only the image to be edited 300 is included even when the image to be edited 300 is greater than the image display area 201 and the image display area 201 will include images other than the image to be edited 300 during same size display mode.

When the display position of the image display area 201 is compensated for in the above-described manner, upon using the display assist function described in the second embodiment, there will be cases where a clicked position will not be displayed at the center of the screen even when coordinates which are close to the edge of the image is clicked. In such cases, it may be impossible to distinguish which portion has been modified. In addition, when the display area is large although the area is near the center of the screen, it may be difficult to accurately grasp which point is the center.

In consideration of the above, the display position is computed through the same processing as in the second embodiment, and the mouse cursor is moved to a position indicated by processing information after changing the display position according to the processing described with FIGS. 23 and 24. In other words, the position of the mouse cursor becomes the application position of the image processing. In addition, the mode is switched to either lack area interpolation mode or stamp mode according to processing contents so that such contents may be easily comprehended. This allows accurate understanding on what processing has been performed on what area.

Figure 25:
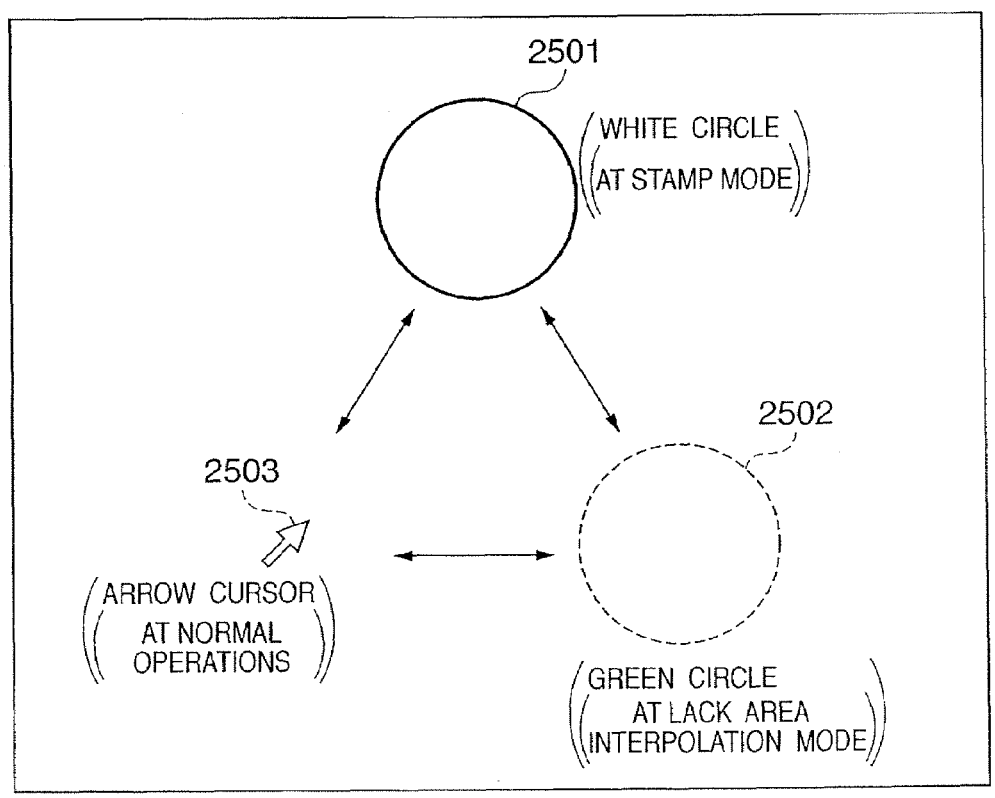
FIG. 25 is a diagram showing a transition of cursor configuration corresponding to the third embodiment of the present invention.

In the present embodiment, the mouse configuration is changed according to operation mode. For instance, as shown in FIG. 25, a white circle 2501 with a radius r designated by the radius slider 209 is used during stamp mode. In addition, a green circle 2502 with a radius r is used during lack area interpolation mode 503, while a normal arrow cursor 2503 is used in other cases.

A determination method for a position P (Px, Py) of the mouse cursor using the top left of the image display area 201 as a reference point will now be described. When there is no display position compensation as described in FIGS. 23 and 24, Px and Py will always assume the following:

$Px=WindowW/2$ $Py=WindowH/2$

However, when the display position is compensated for, the values of Px and Py change according to the compensation amount of the display position. When the respective compensation amounts of Px and Py are PFx and PFy, Px and Py may be expressed by the following equation.

$Px=WindowW/2+PFx$ $Py=WindowH/2+PFy$

The initial values of PFx and PFy are 0. A computation method of PFx and PFy when display position compensation is performed will now be described. Using a value MX prior to setting MX to 0 in step S2305 of FIG. 23 and a value MX' compensated for in step S2307, PFx may be obtained as follows:

$PFx=MX-MX'$

In a similar manner as PFx, using a value MY prior to setting MY to 0 in step S2405 and a value MY' compensated in step S2407, PFy may be obtained as follows.

$PFy=MY-MY'$

In this manner, by changing the position and shape of the mouse cursor, accurate understanding on what processing has been performed on what position may be realized on the last processed image even when display position compensation has been performed on the image display area 201.

As described, the use of the image editing apparatus according to the present invention enables image processing to be performed without destroying the original images, and efficient image processing to be performed even when handling a plurality of images.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-234701, filed Aug. 12, 2005, 2006-000790, filed Jan. 5, 2006, which are hereby incorporated by reference herein in their entirety.

What is claimed is:

1. An image editing apparatus for processing a plurality of image data to be edited that are stored in a storage unit and controlling the display of the image data to be edited on a display unit, the image editing apparatus comprising:
   an image processing unit adapted to perform image processing on the image data to be edited;
   a history storage unit adapted to store processing history information of image data which have previously undergone image processing by the image processing unit;
   a position obtaining unit adapted to obtain position information on the position at which the image processing had been applied to the previously image-processed image data from the processing history information; and
   a display controller adapted to cause a portion of the image data to be edited, to which the image processing is to be applied, to be displayed on a display area on the display unit, based on the position information,
   wherein the display controller compensates for the position of the display area in relation to the image to be edited in at least any of the width direction and the height direction of the image to be edited so that only the image to be edited is included in a displayed image within the display area when the displayed image includes images other than the image to be edited.

2. The image editing apparatus according to claim 1, wherein the display controller causes the portion of the image data to be edited and to be displayed corresponding to the position information to be identifiably displayed in the displayed image after compensation.

3. The image editing apparatus according to claim 2, wherein the display controller further causes a type of image processing to be applied to the portion to be identifiably displayed for the portion of the image data to be edited and to be displayed corresponding to the position information.

4. An image editing apparatus for processing a plurality of image data to be edited that are stored in a storage unit and controlling the display of the image data to be edited on a display unit, the image editing apparatus comprising:
   an image processing unit adapted to perform image processing on the image data to be edited;
   a history storage unit adapted to store processing history information of image data which have previously undergone image processing by the image processing unit;
   a position obtaining unit adapted to obtain position information on the position at which the image processing had been applied to the previously image-processed image data from the processing history information; and
   a display controller adapted to cause a portion of the image data to be edited, to which the image processing is to be applied, to be displayed on a display area on the display unit, based on the position information,
   wherein the display controller causes a portion in newly selected image data, corresponding to the position information to be displayed as the portion to which the image processing is to be applied, according to an instruction from a user to change the image data,
   wherein the display controller performs a conversion process on the position information using the width and height of the newly selected image data, and causes a position of the newly selected image data, corresponding to the position information after conversion to be displayed.

5. A control method for an image editing apparatus comprising a storage section for storing a plurality of image data to be edited, and a display section for displaying the image data to be edited, the control method comprising:
   an image processing step for performing image processing on the image data to be edited;
   a position information obtaining step for obtaining position information on the position at which image processing had been applied to previously image-processed image data from information, stored in a history storage section, regarding the processing history of the image data to be edited which have previously undergone image processing; and
   a display control step which causes a portion of the image data to be edited, on which image processing is to be performed, to be displayed on the display area on the display section, based on the position information,
   wherein the position of the display area in relation to the image to be edited is compensated for in the display control step in at least any of the width direction and the height direction of the image to be edited so that only the image to be edited is included in a displayed image within the display area, when the displayed image includes images other than the image to be edited.

6. The control method for an image editing apparatus according to claim 5, wherein the portion of the image data to be edited on which image processing is to be performed, corresponding to the position information, is identifiably displayed on the displayed image after compensation is performed in the display control step.

7. The control method for an image editing apparatus according to claim 6, wherein the type of image processing applied to the portion of the image data to be edited and to be image processed is further identifiably displayed in the display control step for the portion of the image data to be edited corresponding to the position information prior to the compensation.

8. A control method for an image editing apparatus comprising a storage section for storing a plurality of image data to be edited, and a display section for displaying the image data to be edited, the control method comprising:

an image processing step for performing image processing on the image data to be edited;

a position information obtaining step for obtaining position information on the position at which image processing had been applied to previously image-processed image data from information, stored in a history storage section, regarding the processing history of the image data to be edited which have previously undergone image processing; and a display control step which causes a portion of the image data to be edited, on which image processing is to be performed, to be displayed on the display area on the display section, based on the position information, wherein a portion of newly selected image data to be edited and image processed corresponding to the position information is displayed in the display control step as the portion of the image data to be edited to which the image processing is to be applied, according to an instruction from a user to change the image data, wherein a conversion process is performed on the position information using the width and height of the newly selected image data and wherein a position corresponding to the position information after conversion is displayed in the display control step.

9. A computer-readable storage media which stores a computer program which causes a computer to execute a control method for an image editing apparatus comprising a storage section for storing a plurality of image data to be edited, and a display section for displaying the image data to be edited, the method comprising:

an image processing step for performing image processing on the image data to be edited;

a position information obtaining step for obtaining position information on the position at which image processing had been applied to previously image-processed image data from information, stored in a history storage section, regarding the processing history of image data to be edited which have previously undergone image processing; and a display control step which causes a portion of the image data to be edited, on which image processing is to be performed, to be displayed on the display area on the display section, based on the position information, wherein the position of the display area in relation to the image to be edited is compensated for in the display control step in at least any of the width direction and the height direction of the image to be edited so that only the image to be edited is included in a displayed image within the display area, when the displayed image includes images other than the image to be edited.

10. A computer-readable storage media which stores a computer program which causes a computer to execute a control method for an image editing apparatus comprising a storage section for storing a plurality of image data to be edited, and a display section for displaying the image data to be edited, the method comprising:

an image processing step for performing image processing on the image data to be edited;

a position information obtaining step for obtaining position information on the position at which image processing had been applied to previously image-processed image data from information, stored in a history storage section, regarding the processing history of the image data to be edited which have previously undergone image processing; and a display control step which causes a portion of the image data to be edited, on which image processing is to be performed, to be displayed on the display area on the display section, based on the position information, wherein a portion of newly selected image data to be edited and image processed corresponding to the position information is displayed in the display control step as the portion of the image data to be edited to which the image processing is to be applied, according to an instruction from a user to change the image data, and wherein a conversion process is performed on the position information using the width and height of the newly selected image data and wherein a position corresponding to the position information after conversion is displayed in the display control step.

* * * * *